(12) United States Patent
West

(10) Patent No.: US 10,814,995 B2
(45) Date of Patent: Oct. 27, 2020

(54) HIGH-MOUNTED AIRCRAFT NACELLE

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 663 days.

(21) Appl. No.: 15/689,304

(22) Filed: Aug. 29, 2017

(65) Prior Publication Data
US 2019/0061966 A1 Feb. 28, 2019

(51) Int. Cl.
| B64D 29/06 | (2006.01) |
| B64D 29/02 | (2006.01) |
| B64C 7/02 | (2006.01) |
| B64D 27/26 | (2006.01) |

(52) U.S. Cl.
CPC ............ *B64D 29/06* (2013.01); *B64C 7/02* (2013.01); *B64D 27/26* (2013.01); *B64D 29/02* (2013.01); *B64D 2027/264* (2013.01)

(58) Field of Classification Search
CPC ........ B64D 29/02; B64D 27/26; B64D 29/06; B64C 7/02
See application file for complete search history.

(56) References Cited

U.S. PATENT DOCUMENTS

| 3,727,862 | A | * | 4/1973 | Kaufhold | B64D 27/18 244/54 |
| 4,044,973 | A | * | 8/1977 | Moorehead | B64D 27/20 244/54 |
| 4,821,980 | A | * | 4/1989 | Clausen | B64D 27/14 244/54 |
| 5,443,229 | A | * | 8/1995 | O'Brien | B64D 27/20 244/54 |
| 7,007,890 | B2 | * | 3/2006 | Beutin | B64D 27/20 244/54 |
| 8,328,132 | B2 | * | 12/2012 | Marche | B64D 27/20 244/53 R |
| 9,328,630 | B2 | * | 5/2016 | Brochard | F01D 25/24 |

* cited by examiner

*Primary Examiner* — Brian M O'Hara
(74) *Attorney, Agent, or Firm* — Hovey Williams LLP

(57) ABSTRACT

A nacelle mounted above a wing of an aircraft. A support structure on the nacelle above the pylon resists forces in different directions, and includes door supports allowing the door to be opened upwardly. A retaining structure on the pylon below the nacelle resists forces in different directions, and includes a fixed support track and multiple keepers. Each keeper includes a first end which slides within the channel, and a second end which engages a latch on the closed door. A pylon below the nacelle supports the nacelle and an engine in the nacelle above the wing, increases aerodynamic efficiency, and may include a side spar for supporting the engine from the side. A fire seal assembly includes a depressor surface and a fire seal, and the latter does not contact the former until the door is almost closed, so that compression is substantially direct and scrubbing is reduced.

29 Claims, 22 Drawing Sheets

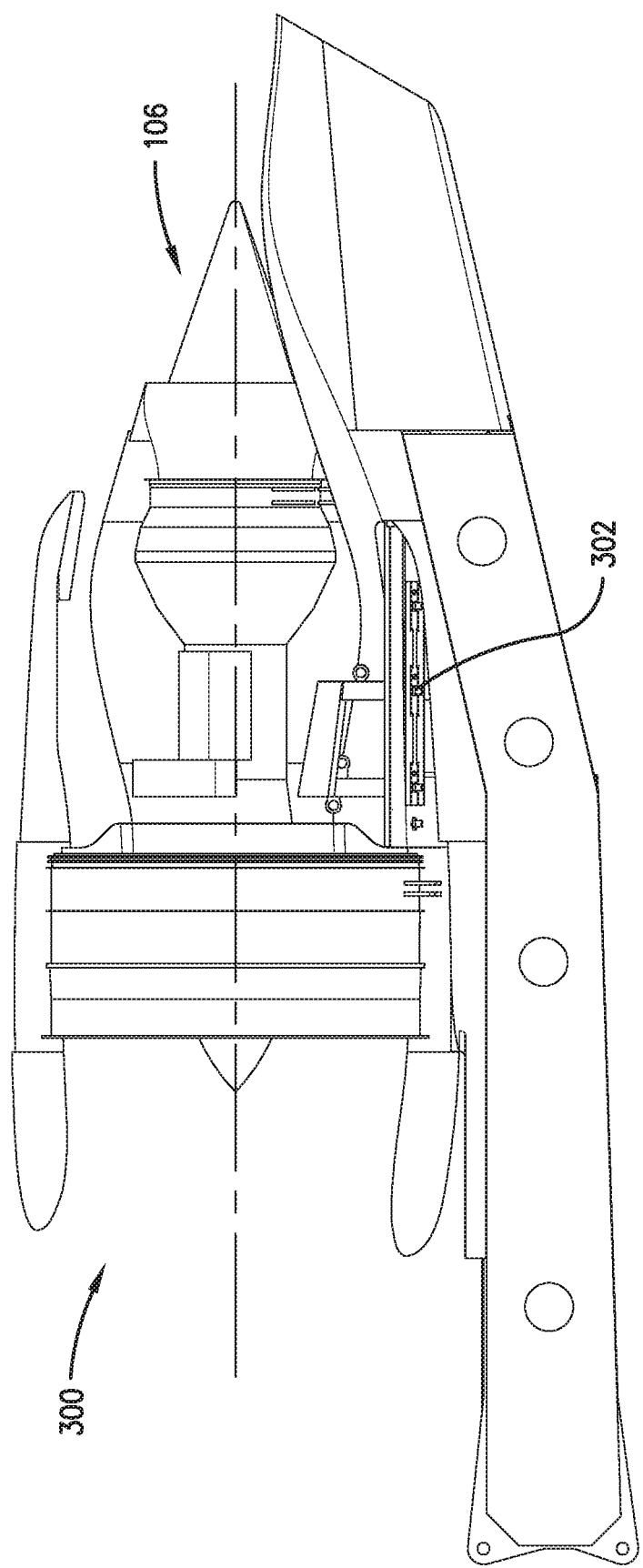

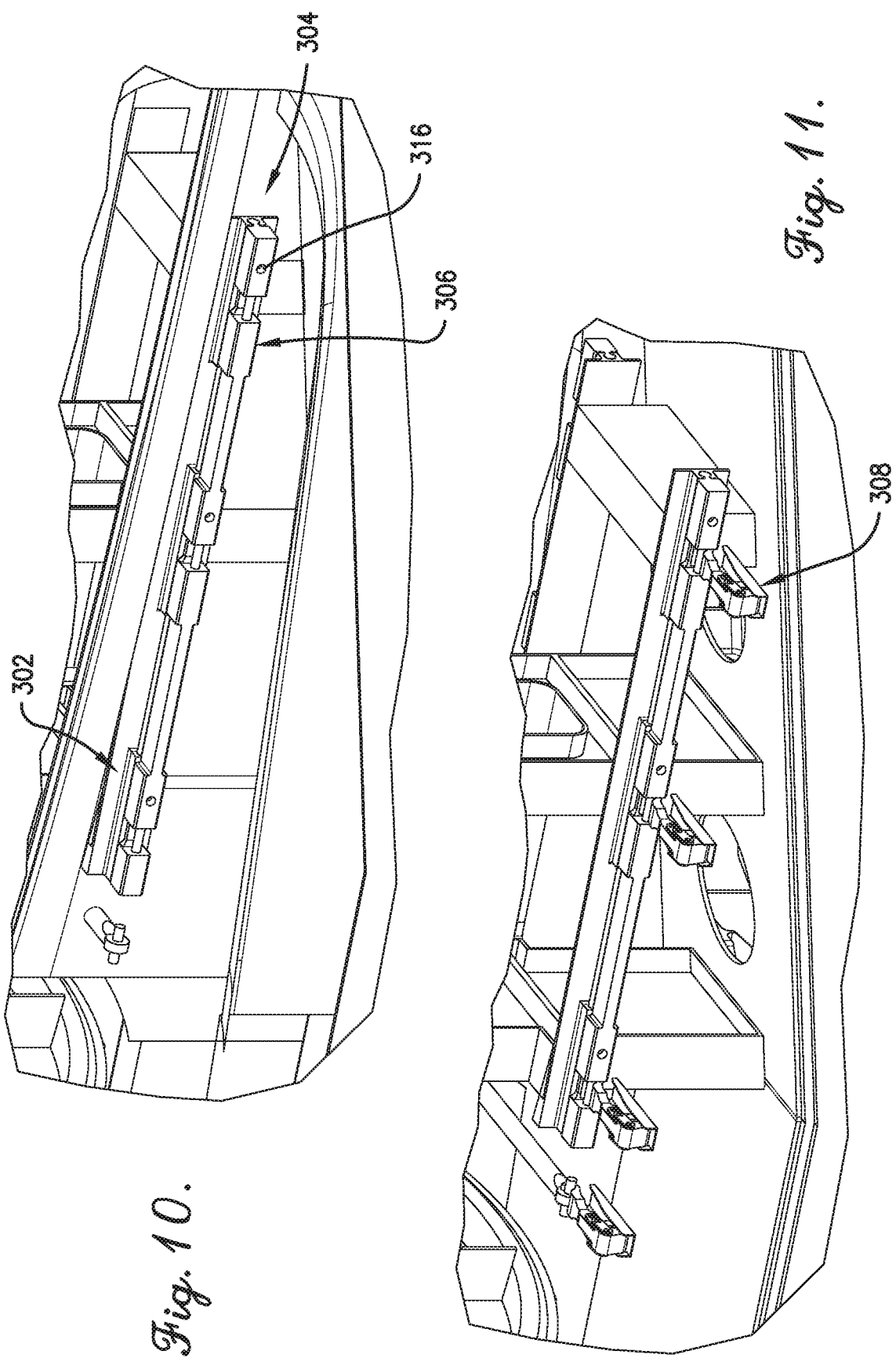

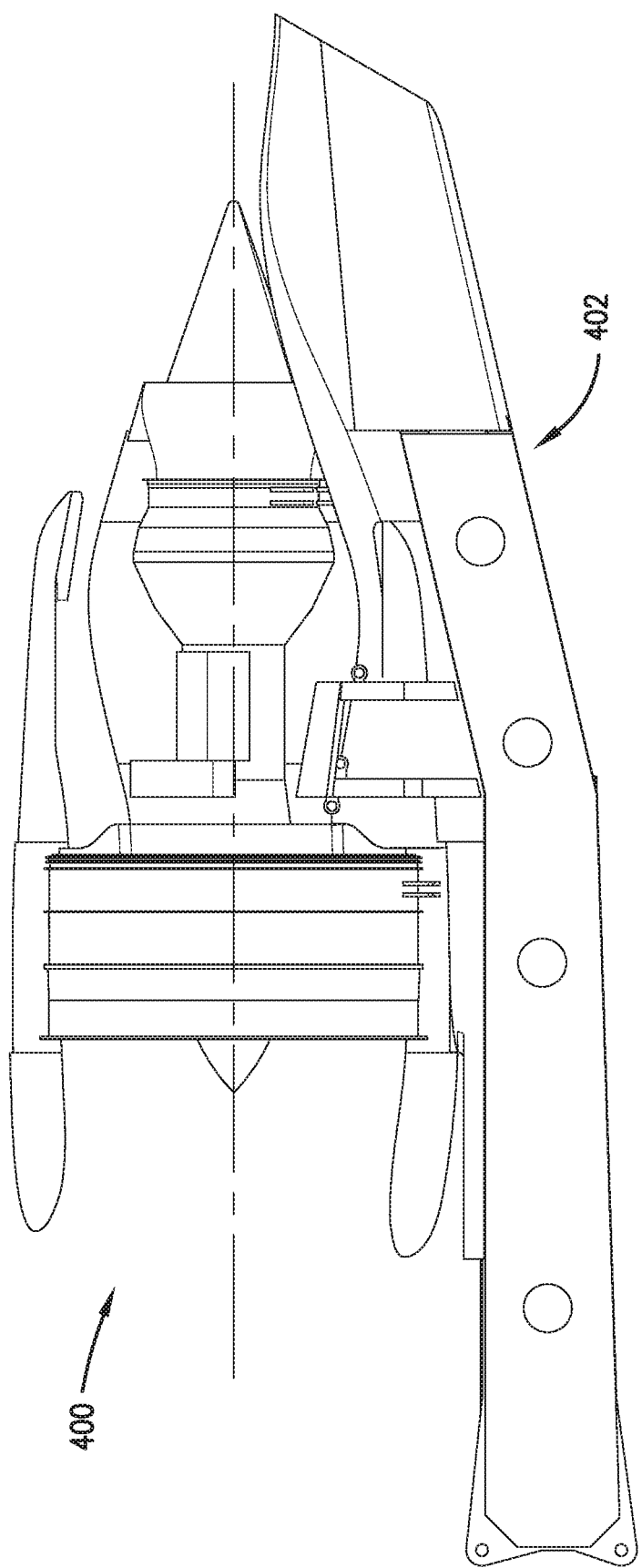

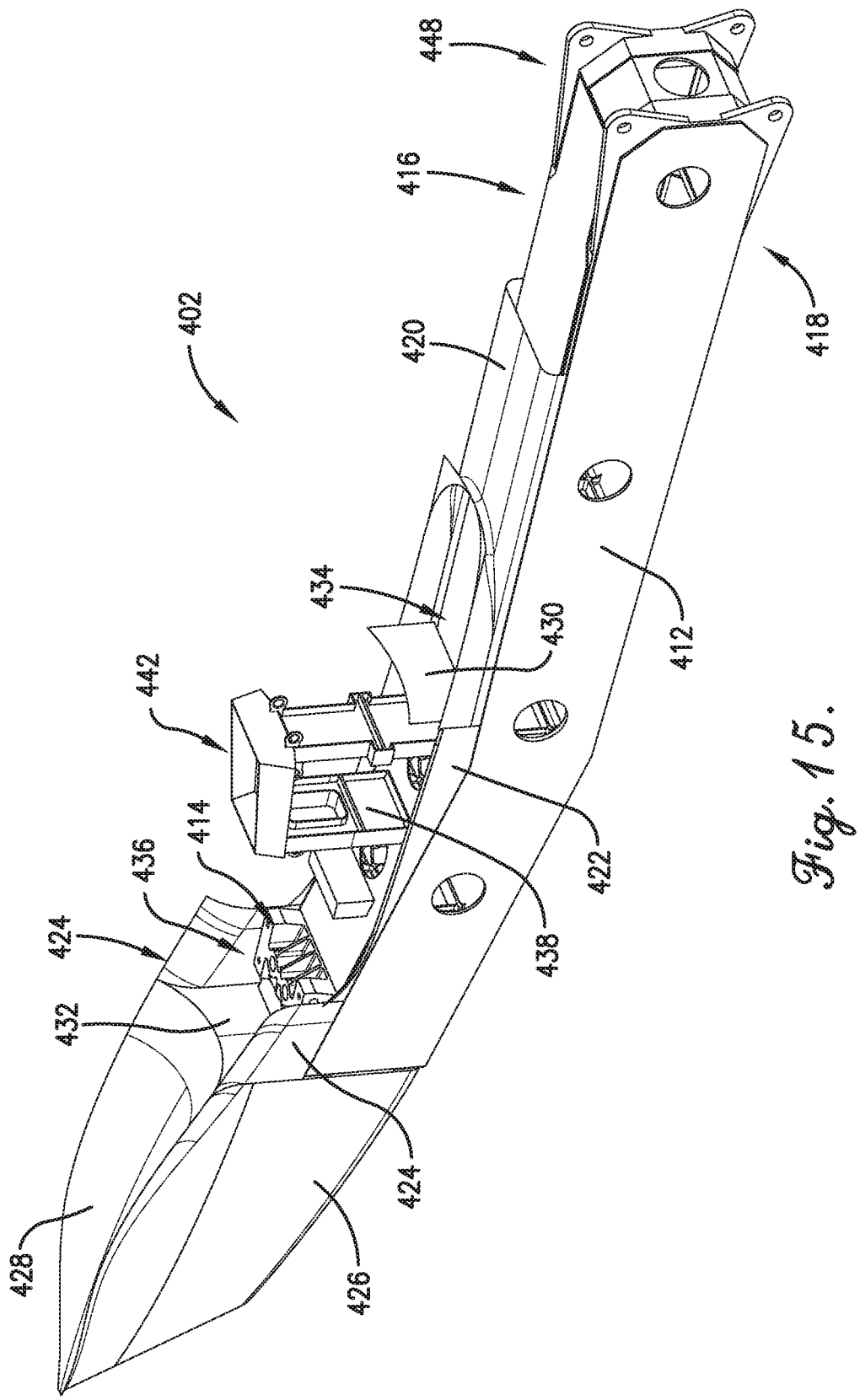

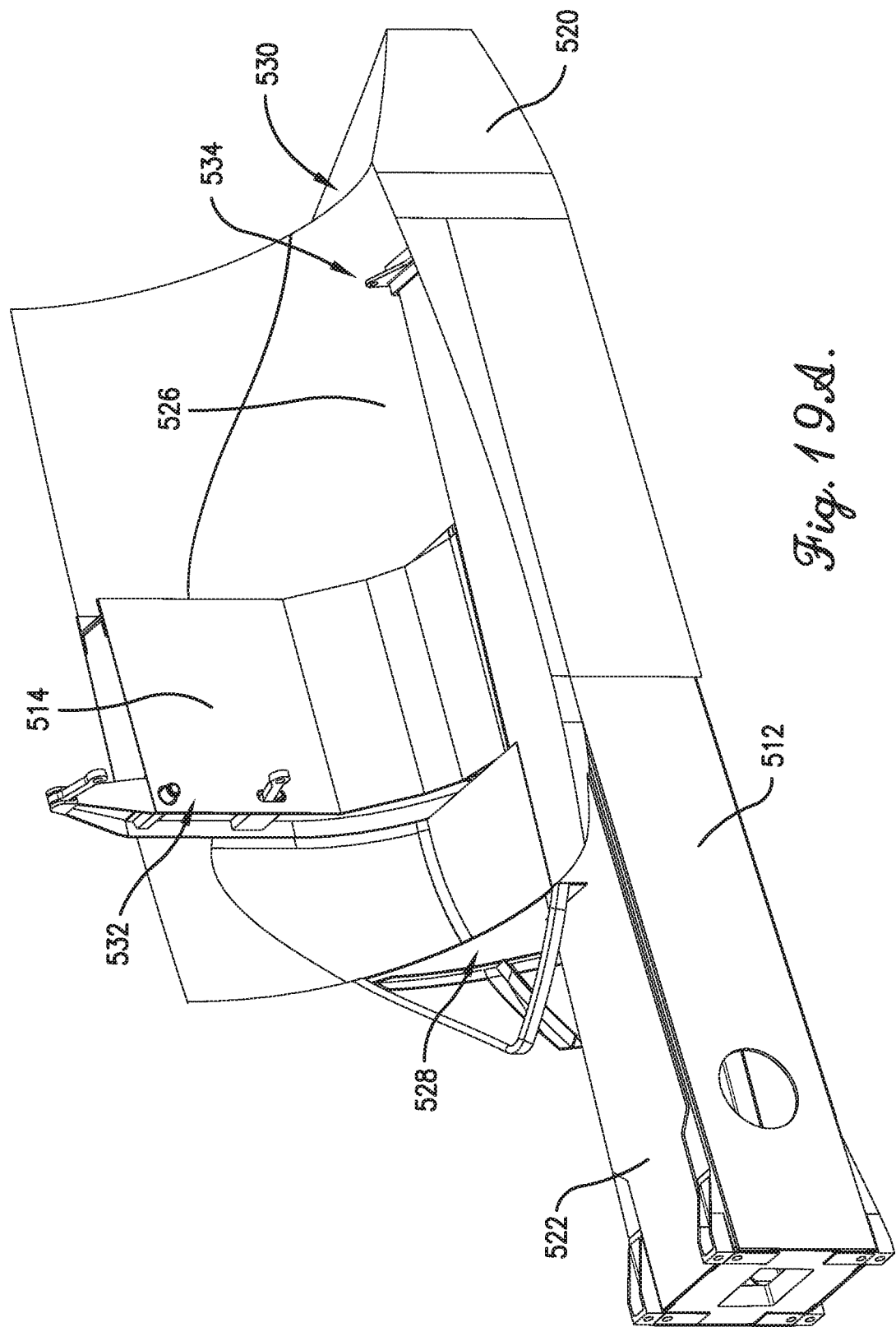

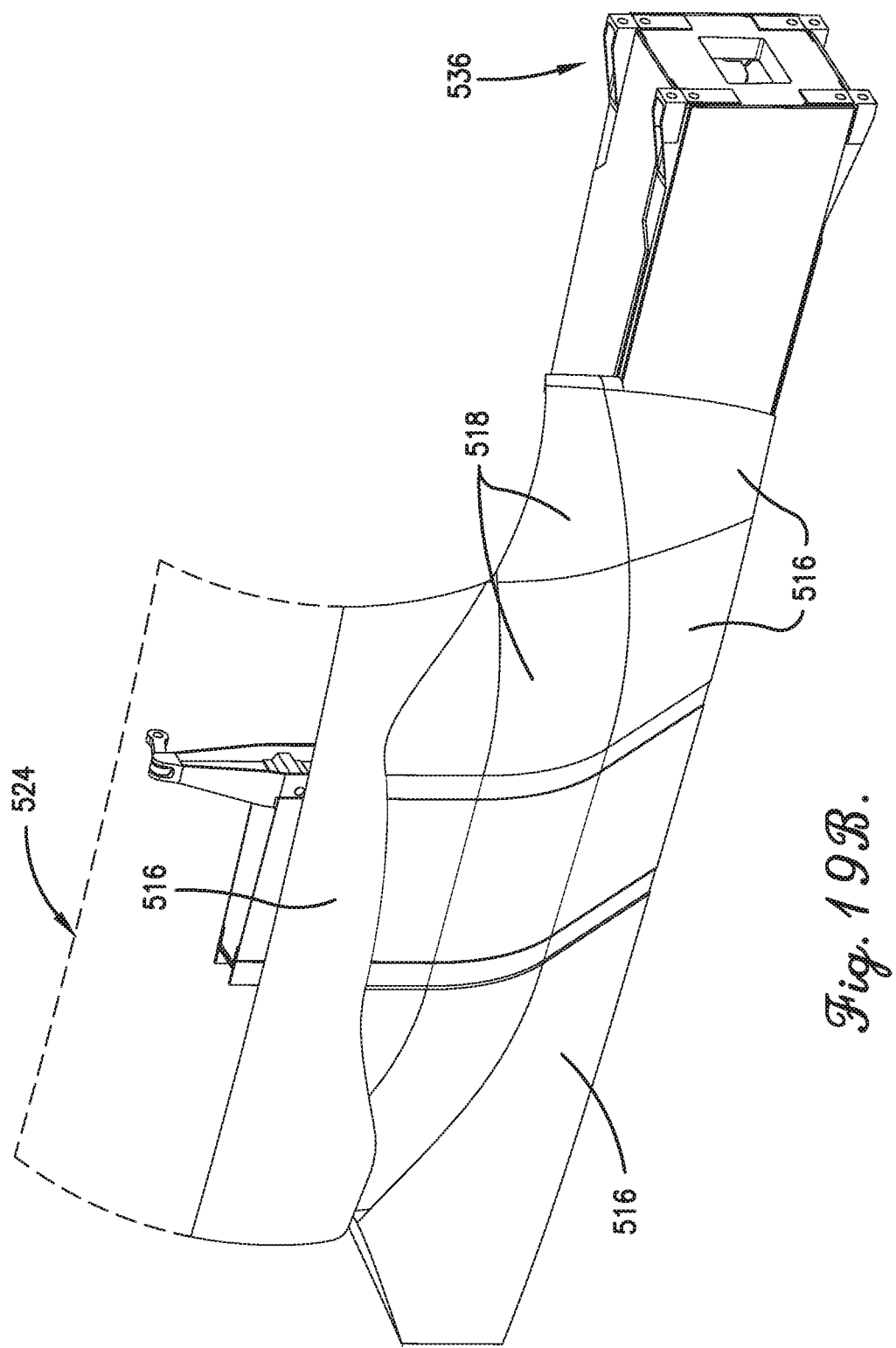

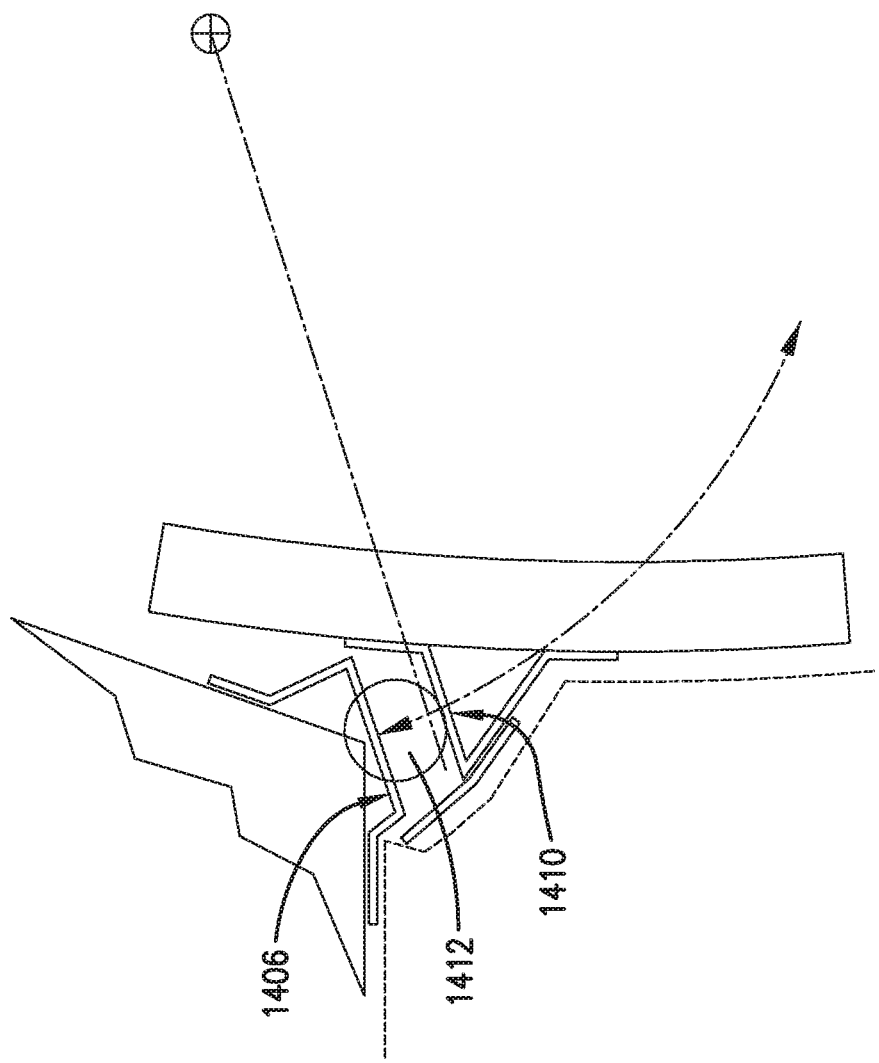

HIGH-MOUNTED AIRCRAFT NACELLE

FIELD

The present invention relates to nacelles and nacelle pylons, such as are used on aircraft to house and support engines, and more particularly, embodiments concern a high-mounted nacelle having a support structure for supporting cowl and/or thrust reverser doors, a retaining structure for securing the doors, a bottom-mount or side-mount pylon, and/or a fire seal assembly and fluid management system.

BACKGROUND

Aircraft engine nacelles may be positioned below, in, or above the wings, and each position may provide certain design and/or performance advantages and disadvantages. Recently, there has been increased industry interest in high-mounted nacelles positioned above the wings or blended, or hybrid, wing bodies (hereafter generically referred to also as wings). In particular, the increasing diameters of engine fans are driving a search for alternative engine positions to avoid requiring excessively tall landing gear and to avoid interference (interaction) drag between the nacelle and the wing.

Currently, three of the National Aeronautics and Space Administration's five X-Plane proposals have high-mounted nacelles positioned above or above and behind the airframe/wing. Boeing's blended wing body (BWB) and Lockheed Martin's hybrid wing body (HWB) designs employ an ultra-high bypass (UHB) turbofan engine high-mounted on a pylon that is attached to and cantilevered from a rear spar of the airframe, and DZYNE Technologies' BWB employs a very high bypass (VHB) turbofan engine high-mounted on a pylon that is attached to and cantilevered from a rear spar of the airframe. In fact, high-mounted engine nacelles may be the competing or replacement design for the next generation of aircraft. However, locating the nacelle above the wing creates distinct challenges which must be overcome.

This background discussion is intended to provide information related to the present invention which is not necessarily prior art.

SUMMARY

Embodiments of the present invention address the above-described and other problems and limitations in the prior art by providing high-mounted nacelle having a support structure for supporting cowl and/or thrust reverser doors, a retaining structure for securing the doors, a bottom-mount or side-mount pylon, and/or a fire seal assembly and fluid management system. These features are generally independent of each other, and different embodiments of the nacelle may incorporate any one, any combination, or all of the features.

An embodiment of a support structure for a nacelle housing an engine, with the nacelle being mounted on a pylon above a surface of an aircraft and including a door, may comprise a lower component and an upper component, and may be located on the nacelle above the pylon. The lower component may include a forward support coupled with the engine and configured to resist a longitudinal force and a vertical force. The upper component may include a fan case attachment, an aft support, and one or more door supports. The fan case attachment may be coupled with a fan case of the engine and to resist the longitudinal force and a lateral force. The aft support may be coupled with the engine and resist the vertical force and the lateral force. The door supports may be coupled with the door and facilitate moving the door between an open position and a closed position.

An embodiment of a retaining structure for a nacelle, with the nacelle being mounted on a pylon above a surface of an aircraft and including a door, may comprise a fixed support track and one or more translatable keepers. The fixed support track may include an elongated channel. Each translatable keeper may include a translatable end configured to be received and slideably repositionable within the elongated channel, and an engagement end configured to releasably engage a latch mechanism on the door and thereby selectively retain the door in a closed position. When the engagement end is engaged with the latch mechanism, the keeper may remain slideably repositionable within the elongated channel in order to accommodate shifting of the door in a longitudinal direction while resisting a vertical force and a lateral force.

An embodiment of a pylon for a nacelle, with the nacelle being mounted on the pylon above a surface of an aircraft and housing an engine, may comprise a structural torque box, a pylon-to-surface fairing, a pylon-to-nacelle fairing, an aft fairing, and a forward engine mount and an aft engine mount. The structural torque box assembly may include an upper spar component and a lower spar component. The pylon-to-surface fairing may be located at a forward end of the pylon, and configured to aerodynamically blend the pylon with the surface of the aircraft. The pylon-to-nacelle fairing may be located at a forward end of the pylon, and configured to aerodynamically blend the pylon with the nacelle. The aft fairing may be located at an aft end of the pylon, and configured to provide an aerodynamic closeout. The forward engine mount may be configured to couple with a forward portion of an engine, and the aft engine mount may be configured to couple with an aft portion of the engine.

An embodiment of a side-mount pylon for a nacelle, the nacelle being mounted on the pylon above a surface of an aircraft and housing an engine, may comprise a structural torque box, a pylon-to-surface fairing, a pylon-to-nacelle fairing, an aft fairing, and a side spar assembly including a first engine mount. The structural torque box assembly may include an upper spar component and a lower spar component. The pylon-to-surface fairing may be located at a forward end of the pylon, and configured to aerodynamically blend the pylon with the surface of the aircraft. The pylon-to-nacelle fairing may be located at a forward end of the pylon, and configured to aerodynamically blend the pylon with the nacelle. The aft fairing may be located at an aft end of the pylon, and configured to provide an aerodynamic closeout. The side spar assembly may extend outwardly and upwardly from an intermediate portion of the structural torque box assembly, and include the first engine mount configured to couple with a side of the engine.

An embodiment of a fire seal assembly for a nacelle, which may be mounted on a pylon and including a door and housing an engine, may comprise a depressor surface and a fire seal attached to a seal support surface. The depressor surface may be associated with the pylon. The fire seal may be attached to a seal support surface on the door. The door may be moveable in an arc between an open position and a closed position in which the fire seal is in contact with and compressed by the depressor surface, and the depressor surface and the seal support surface may be positioned so that both surfaces are perpendicular to the arc of the door, so that the depressor surface does not contact the fire seal until the door is almost in the closed position, and so that the depressor surface exerts a substantially direct compressive force on the fire seal.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 9 is a cross-sectional side elevation view of a second embodiment of the nacelle of FIG. 1 including the retaining structure;

FIG. 10 is an isometric view of the retaining structure;

FIG. 11 is an isometric view of the retaining structure engaging a plurality of latch mechanisms;

FIG. 14 is a cross-sectional side elevation view of a third embodiment of the nacelle of FIG. 1 including the pylon;

FIG. 15 is an isometric view of the pylon;

FIG. 19A is an exterior isometric view of the side-mount implementation of the pylon;

FIG. 19B is an interior isometric view of the side-mount implementation of the pylon;

FIG. 29 is a fragmentary cross-sectional side elevation view of a ninth implementation of the fire seal assembly.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
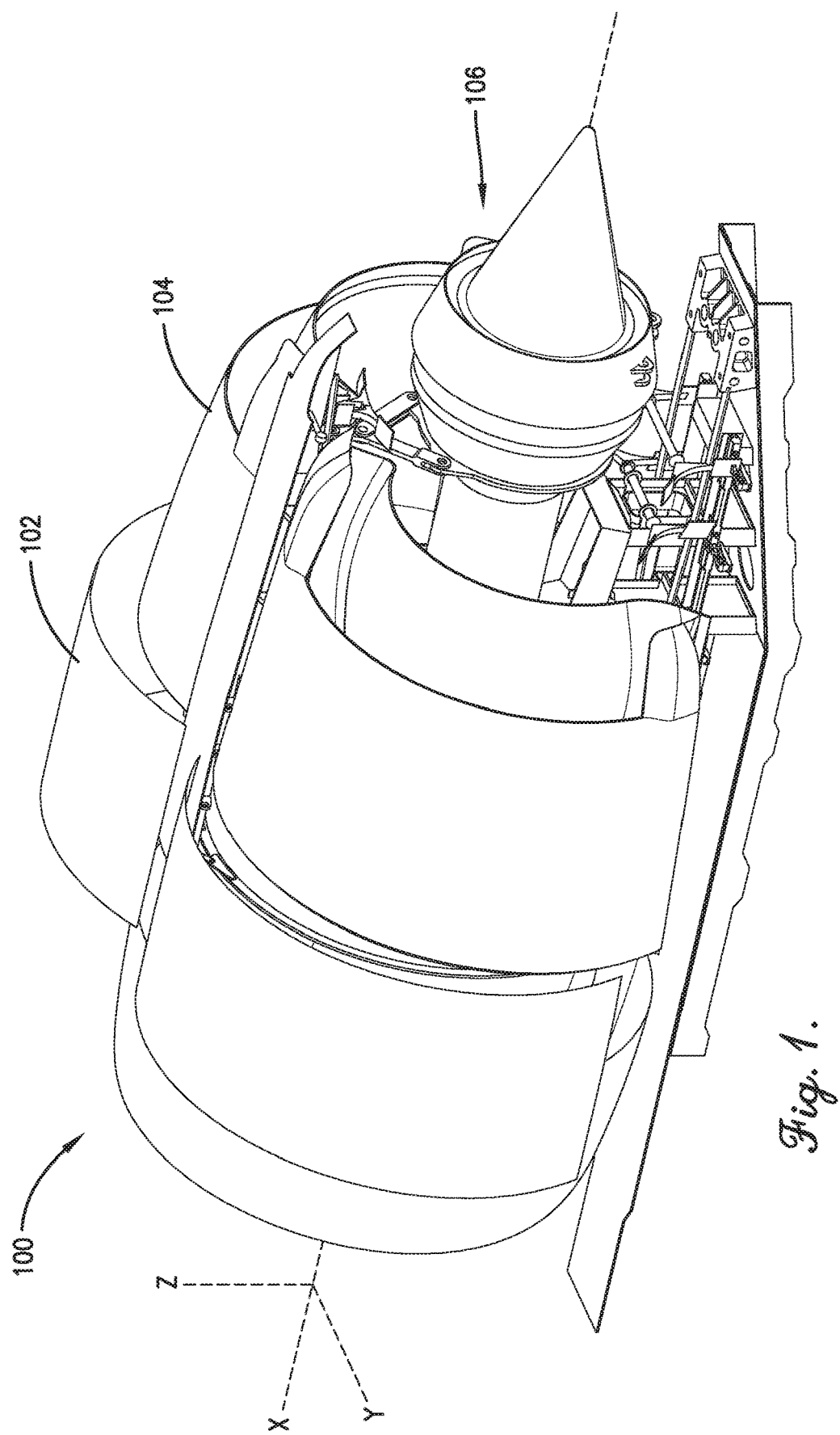
FIG. 1 is a fragmentary isometric view of a nacelle.
Figure 2:
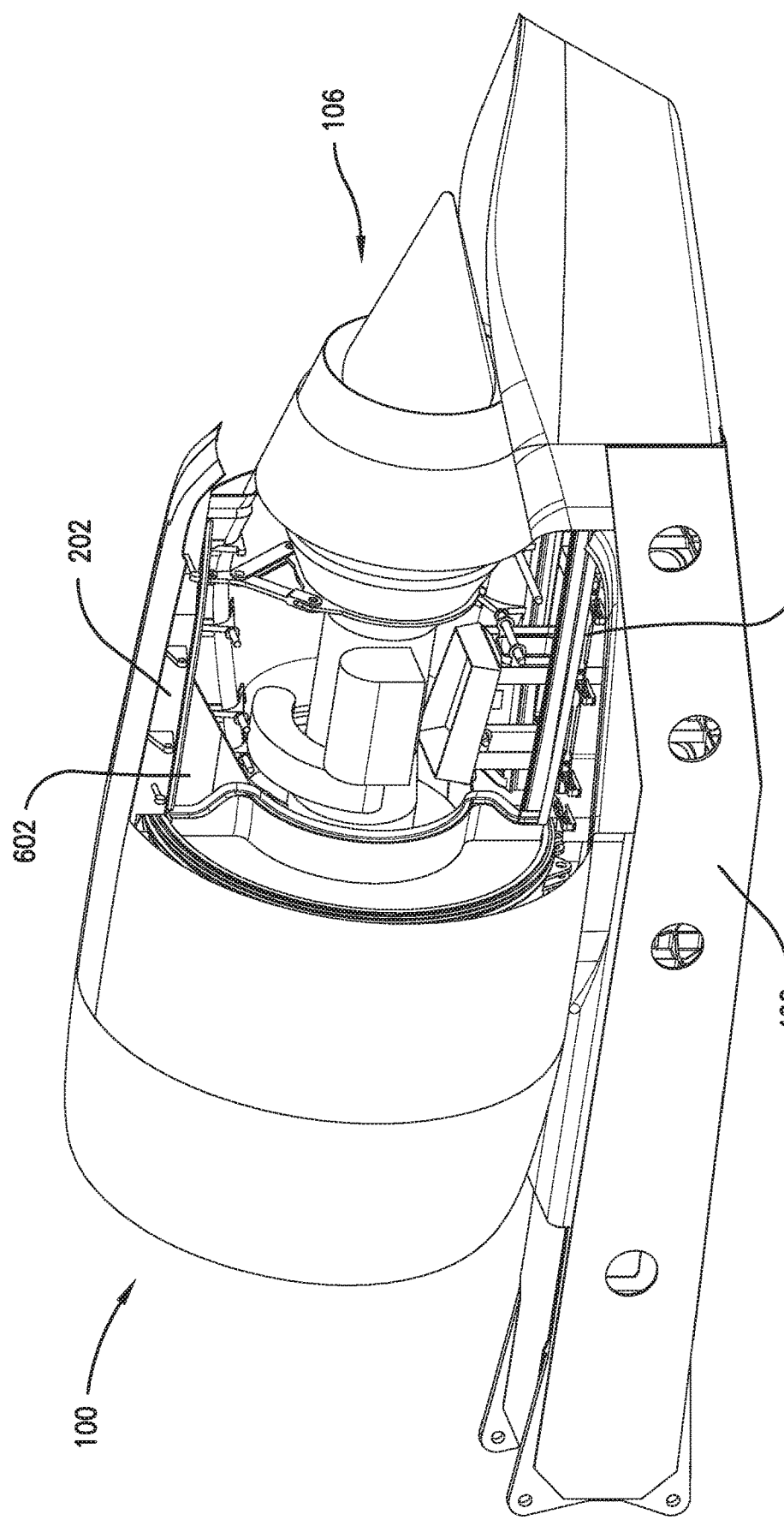
FIG. 2 is a is an isometric view of the nacelle of FIG. 1 with a door removed and incorporating a support structure, a retaining structure, a pylon, and a fire seal assembly.

Broadly characterized, embodiments of the present invention provide a high-mounted nacelle having a support structure for supporting cowl, thrust reverser, or other doors, a retaining structure for securing the doors, a bottom-mount or side-mount pylon, and/or a fire seal assembly and fluid management system. Referring to FIG. 1, the high-mounted nacelle 100 is shown with exemplary cowl doors 102, exemplary thrust reverser doors 104 associated with a thrust reverser, and housing an exemplary engine 106. The nacelle 100 may have a longitudinal or X axis (i.e., a central longitudinal axis of the nacelle 100 and/or engine 106), a corresponding lateral or Y axis, and a corresponding vertical or Z axis. Referring also to FIG. 2, the high-mounted nacelle 100 is shown incorporating the support structure 202 for supporting the cowl and/or thrust reverser doors 102,104, the retaining structure 302 for securing the doors 102,104, the bottom-mount or side-mount pylon 402,502, and the fire seal assembly 602. These features are generally independent of each other, and different embodiments of the nacelle 100 may incorporate any one, any combination, or all of the features.

In particular, a first embodiment of the high-mounted nacelle 200 is shown in FIGS. 3-8 including the support structure 202; a second embodiment of the nacelle 300 is shown in FIGS. 9-13 including the retaining structure 302; a third embodiment of the nacelle 400 is shown in FIGS. 14-20 including the bottom-mount pylon 402 or the side-mount pylon 502; and a fourth embodiment of the nacelle 600 is shown in FIGS. 21-29 including the fire seal assembly 602. While generally shown and described in the context of housing an engine, any of these nacelle embodiments and/or various aspects thereof may be adapted for use in housing munitions, equipment, sensors, instrumentation pods, or aerial refueling apparatuses, and/or other supplies or equipment. Further, while generally described and shown as being positioned above a wing of an aircraft, it will be understood that the nacelle may be located above other surfaces, such as empennage surfaces, of the aircraft.

Referring again to FIG. 1, access to the engine 106 and other components located within the nacelle 100 is facilitated by the cowl doors 102 which may be rotatably mounted on hinges. Similarly, operation of the thrust reverser involves the opening and closing of the thrust reverser doors 104 which may also be rotatably mounted on hinges. In a low-mounted design, these doors may be hinged at the top to pylon-mounted fittings and latched at the bottom to each other. However, because the pylon is located under the engine in a high-mounted design, using the pylon as a support structure does not allow for the same access and operation as the low-mounted design. In particular, doors hinged on the same side as that from which the engine is supported would hinder or block access to engine components when opened. Further, positioning scaffolding from below would be difficult, and technicians would have to stand on the doors to gain access to the engine components.

Embodiments provide the support structure 202 configured to support the doors from above the pylon in order to provide the same or similar access and operation as the low-mounted design. Further, the support structure 202 addresses various forces acting on the nacelle 100. Additionally, the support structure 202 facilitate the pre-integration of nacelle components on the final assembly line, and facilitate changing the engine 106 by allowing the support structure 202 with some or all of the attached nacelle components to be lifted as a unit from the nacelle 100 to expose the engine 106.

Figure 3:
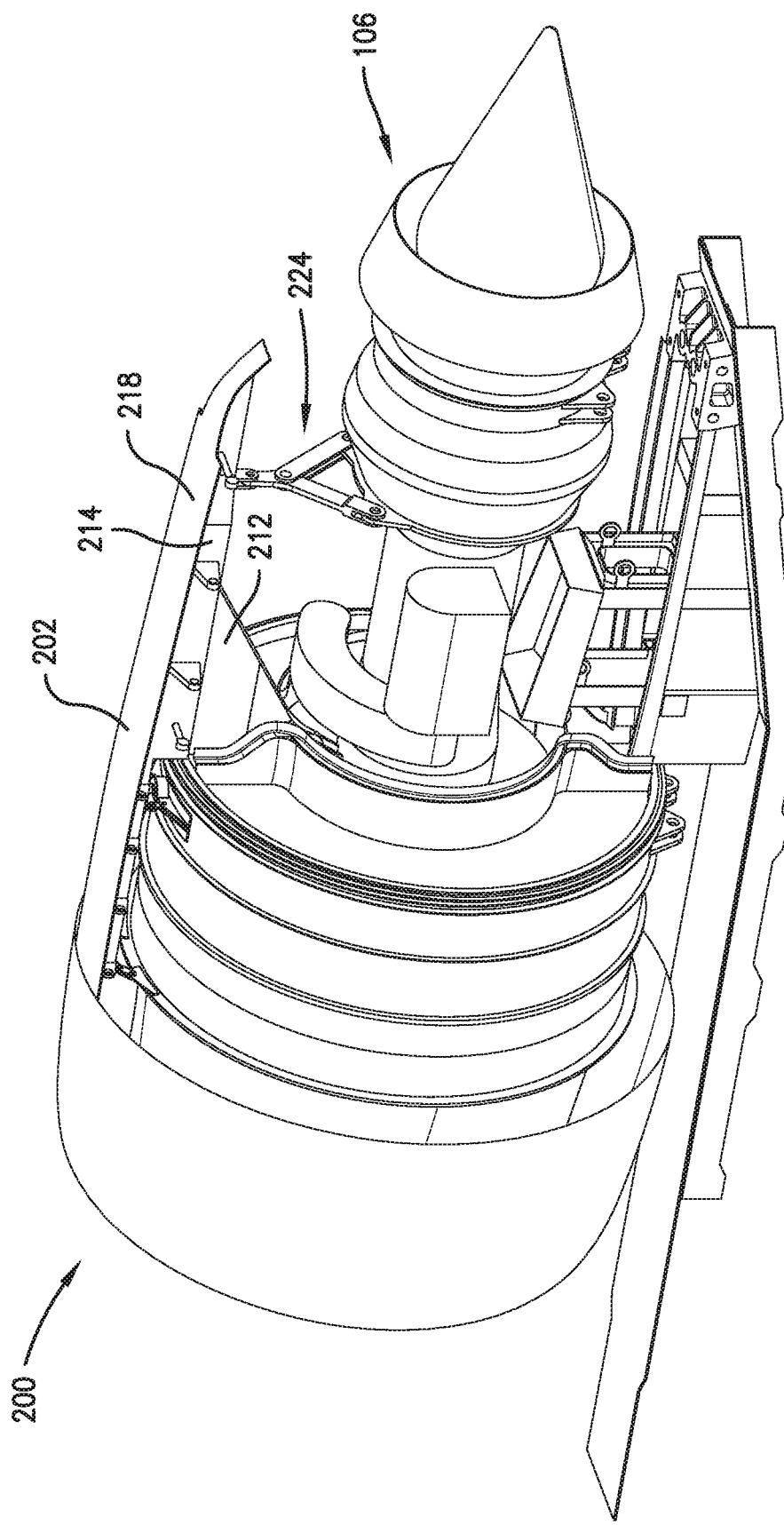
FIG. 3 is an isometric view of a first embodiment the nacelle of FIG. 1 with all doors removed and including a support structure.

Referring to FIG. 3, the first embodiment of the high-mounted nacelle 200 may include the support structure 202 configured to support nacelle components (e.g., the cowl doors 102 and the thrust reverser doors 104) independent of other structures (i.e., the pylon or the airframe) used to support the engine 106. The support structure 202 may be located above or opposite the pylon in order to facilitate similar access and operation as provided by a low-mount design. An exemplary implementation of the support structure 202 may be configured for use with a high by-pass turbofan engine with a separate flow nacelle (i.e., fan air and engine exhaust flow through physically separate ducts and nozzles). This implementation of the support structure 202 may be compatible with features to integrate a translating sleeve cascade thrust reverser or fan duct (no reverser).

Figure 4:
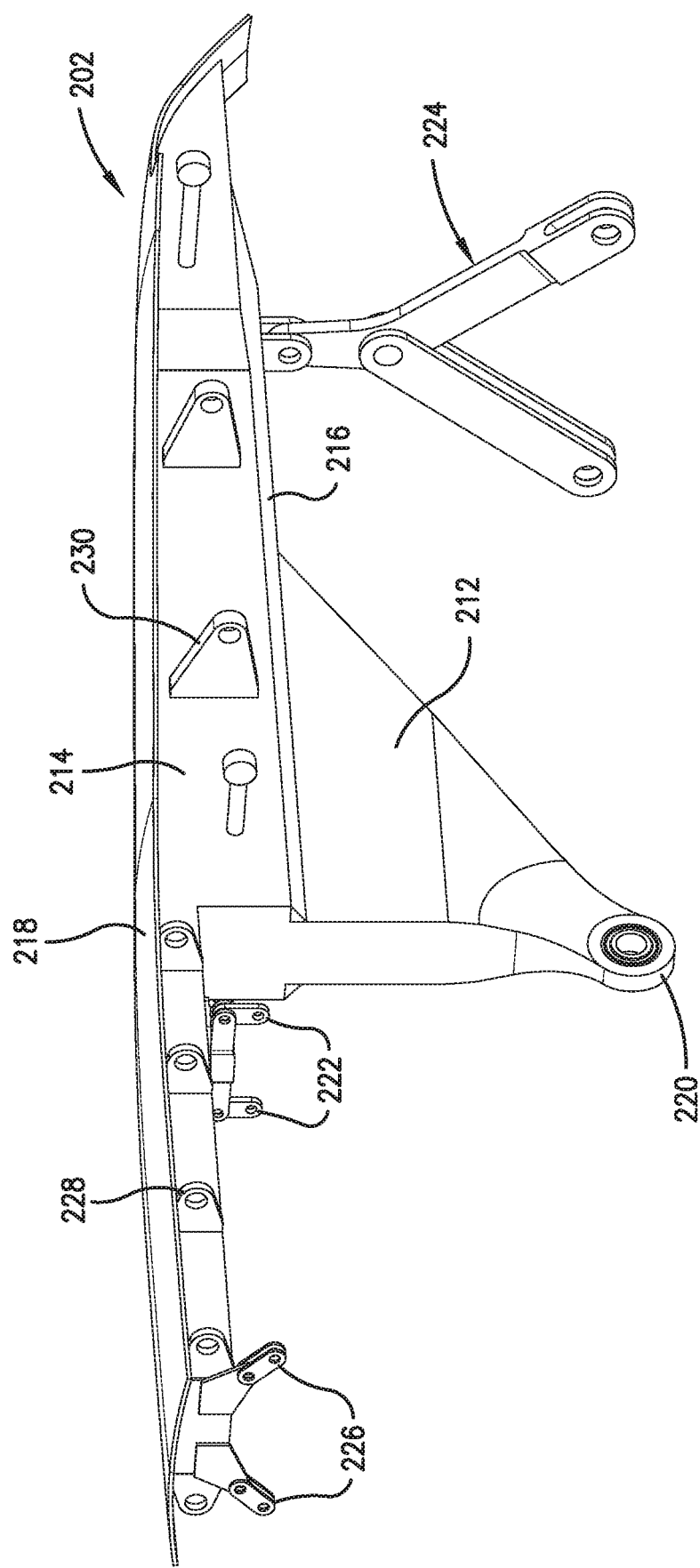
FIG. 4 is a perspective view of the support structure.

Referring also to FIG. 4, the support structure 202 may broadly comprise a lower component 212; an upper component 214; two or more fire seal depressors 216; a fairing 218; a forward support 220; an aft fan case attachment 222; an aft support 224; a forward fan case attachment 226; a plurality of cowl door supports 228; and a plurality of thrust reverser door supports 230. The support structure 202 may be temporarily attachable to but otherwise independent of, partially integrated into, or permanently attached to and fully integrated into the structure of the engine 106. The support structure 102 may be configured to increase bending stiffness along a centerline axis of the engine.

The lower component 212 may be constructed of heat resistant alloys, and the upper component 214 may be constructed of aluminum, steel, and composite materials, and either or both of the lower and upper components 212,214 may be built-up or integrated in construction. The lower and upper components 212,214 may be part of a monolithic structure, or they may be parts of several structures which may be articulated with regard to one another. Although shown as being positioned directly above the engine 106, it will be appreciated that the lower and upper components 212,214, and the support structure 202 in general, may be positioned at substantially any suitable radial position relative to the longitudinal axis of the nacelle 200 or engine 106. The lower and upper components 212,214 may be configured to allow for the routing of various systems from the aircraft and the engine 106. The support structure 202 may house and/or support line replaceable units (LRUs) such as sensors, pumps, and electrical boxes.

The fire seal depressors 216 may be located along a lower edge of the upper component 214, and may cooperate with fire seals mounted on the thrust reverser doors 104 to provide a fire barrier, or fire wall, when the thrust reverser doors 104 are closed. The fire seal depressors 216 may be constructed of a fireproof material. Thermal insulation may be provided on the lower surface of the upper component 214 to allow for using lower temperature capable materials in the upper component 214. The fairing 218 may be located on an upper surface of the upper component 214, and may improve the aerodynamics of the support structure 202.

Portions or all of the fairing 218 may be removable. The fairing 218 may be constructed of metallic, composite, or hybrid materials. The forward support 220 may be located near the engine core on the engine intermediate casing, and may be configured to resist longitudinal forces and vertical forces.

Figure 5:
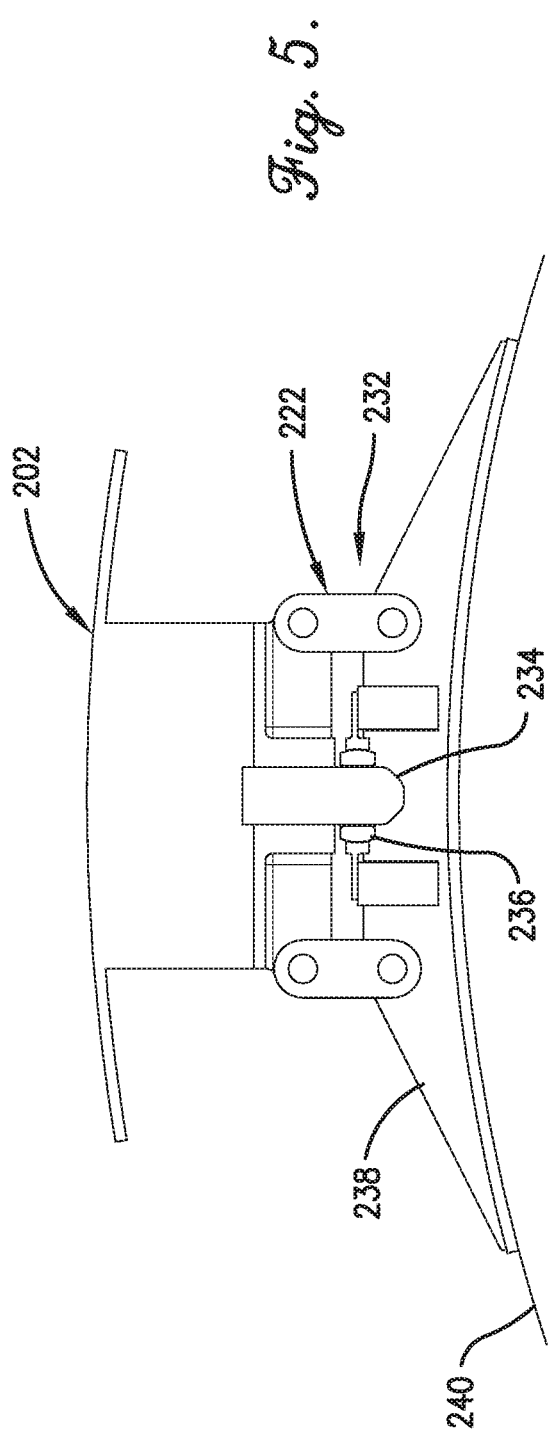
FIG. 5 is a fragmentary cross-sectional front elevation view of an aft fan case attachment portion of the support structure.
Figure 6:
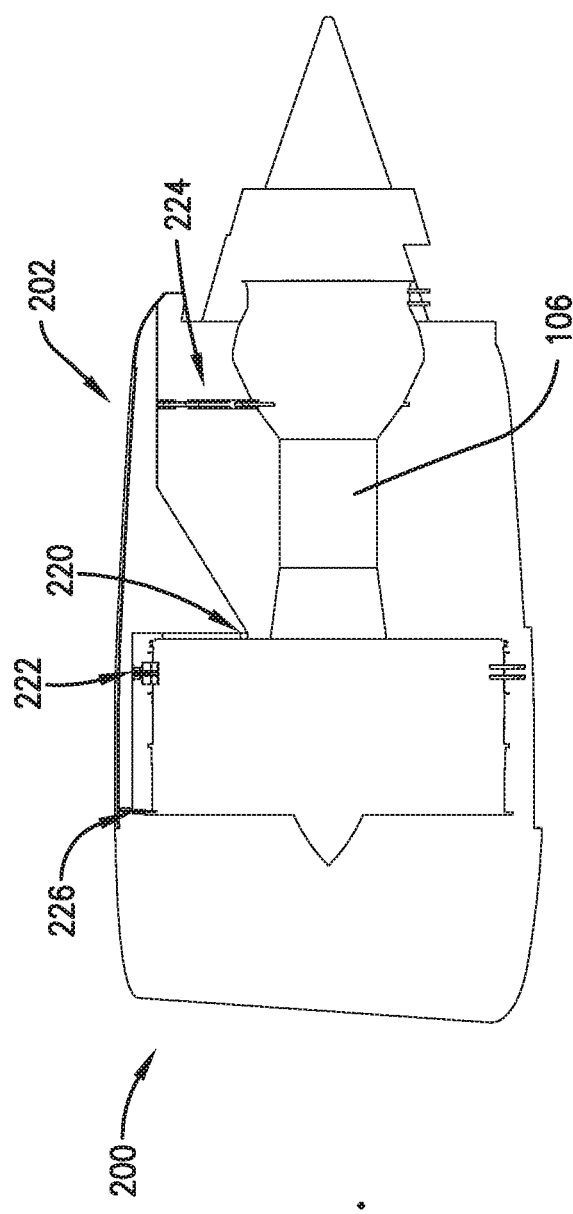
FIG. 6 is a cross-sectional side elevation view of the support structure showing attachments to an engine within the nacelle.

Referring also to FIGS. 5 and 6, the aft fan case attachment 222 may be located adjacent to the fan case outer guide vanes structure, and may be configured to resist longitudinal forces and lateral forces. The aft fan case attachment 222 may include adjustable links 232 to further resist vertical forces. In the illustrated implementation, a "spigot" connection is used having a fitting containing a spigot pin 234 attached to the support structure 202 that engages a spherical bearing 236 mounted to a spigot fitting 238 on the engine aft fan case 240. The spherical bearing 236 allows resistance to longitudinal and lateral forces but allows for flexure (e.g., rolling from side to side of the engine 106 and/or support structure 202 with respect to one another). The spigot connection in combination with the aft support assembly 224 resists twisting about a vertical axis. The fitting containing the spigot pin 234 that connects to the support structure 202 may be permanently attached to the structure 202 or may be attached to the spigot fitting 238 via links and remains with the engine 106 when the support structure 202 is unbolted from the spigot support installation.

The aft support 224 may be used to connect the support structure 202 to the engine casing, and may be configured to resist vertical forces and lateral forces. In combination with the main forward support 220, twisting about a lateral axis is resisted. The aft support 224 may also accommodate thermal expansion of the engine casing and support structure 202. The forward fan case attachment 226 may include support links and rod assemblies, and the links may be configured to resist vertical and lateral loads. The cowl door supports 228 may be located along one or both sides of a forward portion of the upper component 214, and may be configured to couple with and support the cowl doors 102. When the cowl doors 102 are closed, they may latch along their lower edges to cooperating features located on the pylon.

Figure 7:
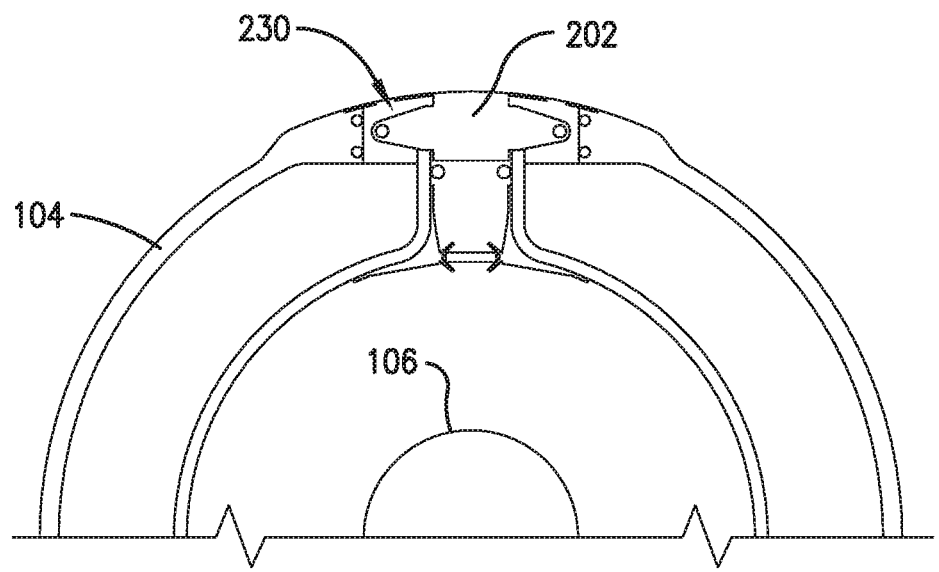
FIG. 7 is a is a fragmentary cross-sectional front elevation view of a first implementation of a door support portion of the support structure.
Figure 8:
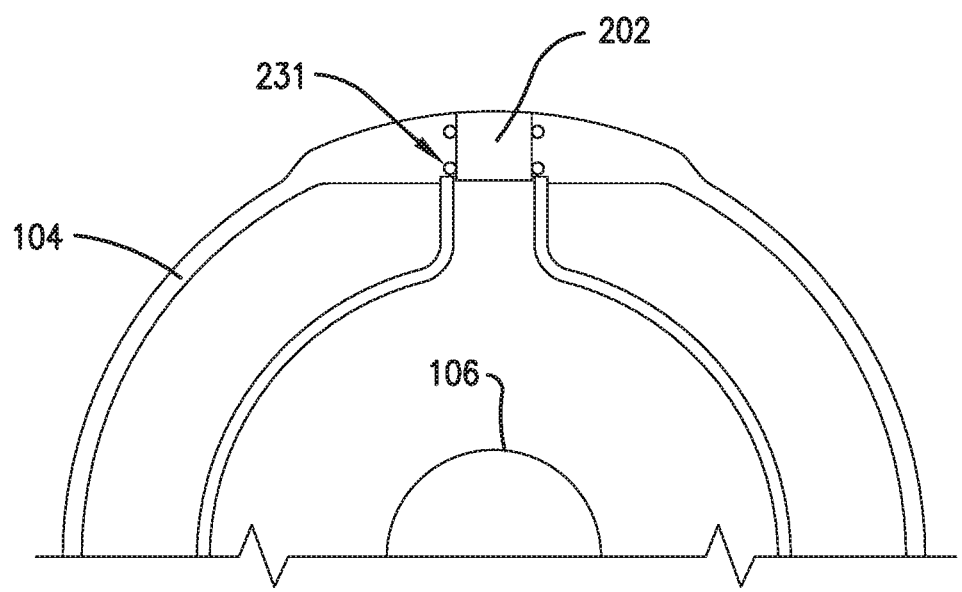
FIG. 8 is a fragmentary cross-sectional front elevation view of a second implementation of the door support portion of the support structure.
Figure 13:
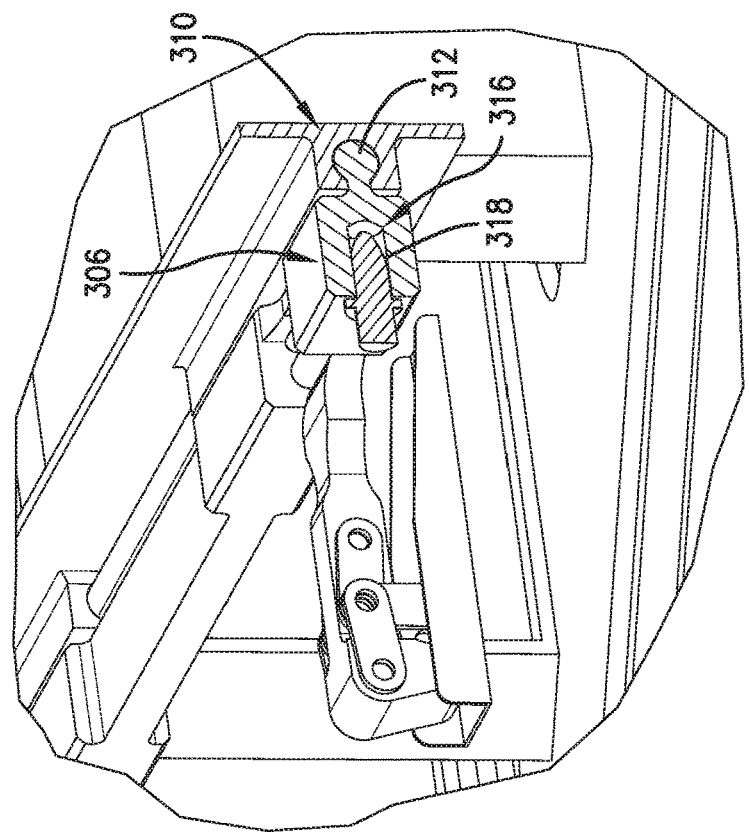
FIG. 13 is a fragmentary isometric view of the retaining structure engaging a dagger pin.
Figure 12:
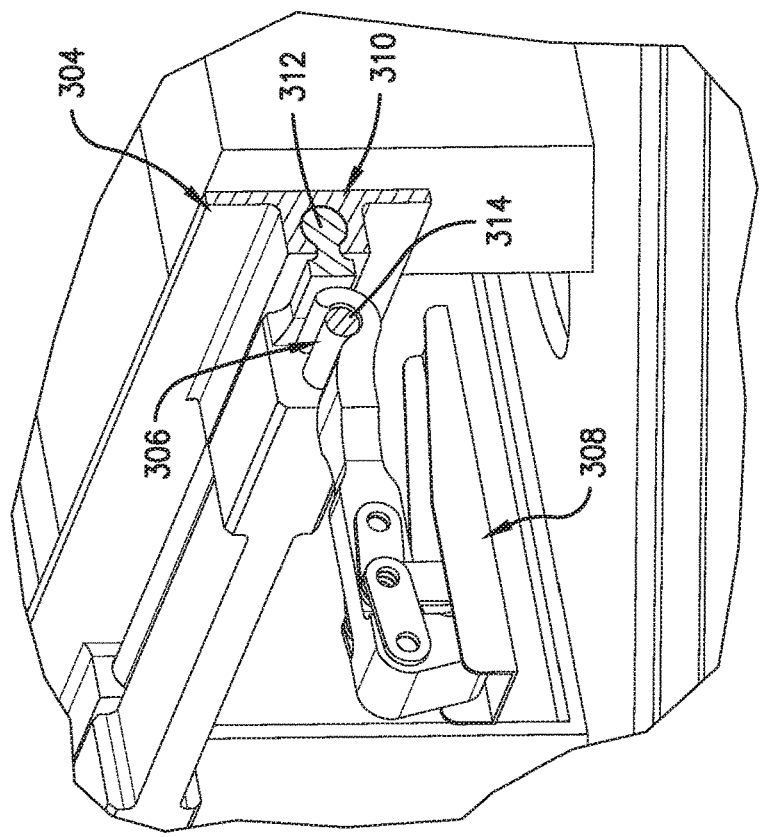
FIG. 12 is a fragmentary isometric view of the retaining structure engaging one of the latch mechanisms.

Referring also to FIG. 7, the thrust reverser door supports 230 may be located along one or both sides of a rearward portion of the upper component 214, and may be configured to couple with and support the thrust reverser doors 104. When the doors 104 are closed, they may latch along their lower edges to cooperating features located on the pylon. Referring also to FIG. 8, for thrust reversers that use sliding rather than hinged doors, the thrust reverser supports may take the form of slide assemblies 231 that cooperate with the thrust reverser doors to facilitate sliding movement between the open and closed positions.

The upper component 214 and the cowl door supports 228 may be "carry-through" structures that provide a side-to-side load path for the cowl doors 102. The upper component 214 and the thrust reverser supports 230 may also be "carry-through" structures that provide a load path across the support structure 202 from one of the thrust reverser doors 104 to the other. These carry-through structures may be floating (i.e., not hard attached) with respect to the support structure 202 or fixed to the support structure 202 and directing the load into and/or through the support structure 202. Seals may be provided to improve the aerodynamics at or near the interfaces of the cowl doors 102 and at or near the interfaces of the thrust reverser doors 104. If the engine fan case compartment is a fire zone, these seals may be constructed of fire resistant materials.

The attachments and supports are examples, and any one or more may be omitted or modified to provide similar functionality in resisting applied forces and achieve required fixity at the attach locations. For example, in various alternative implementations, spigots may be incorporated at the aft fan case and at the main support attach location; the cowl supports and the thrust reverser support aft fan case lug and links may separately attach; components may be incorporated into the engine structure rather than into the support structure; the cowl support structure may be separately supported and/or attached, with the rear portion of the structure being integral with the engine structure; and the support structure may be supported at the fan case and aft support assembly.

Referring again to FIG. 1, access to the engine 106 and other components located within the nacelle 100 is facilitated by the cowl doors 102 which are mounted on hinges. As discussed, in a low-mounted design, the doors 102,104 are typically latched along their bottoms to their counterparts on the opposite side of the nacelle in order to retain the doors in their closed positions. However, in a high-mounted design, the pylon is located under the engine and intervenes between the opposing doors and does not allow for the same interaction as in the low-mounted design.

Embodiments provide the retaining structure 302 configured to receive and retain the doors 102,104 in their closed positions. The retaining structure 302 and corresponding door latches may be located on the sides of the pylon, which facilitates access and visual inspection for closure and locking. Latching the doors 102,104 to the retaining structure 202 rather than to each other may also help to overcome the high closing forces encountered with high by-pass large diameter fans. With regard to the cowl doors 102, latching the doors 102 to the retaining structure 202 rather than to each other limits the effect of a latch failure to a door on one side of the nacelle 100 rather than releasing both doors 102 on opposing sides of the nacelle 100. Further, cowl doors 102 tend to sag under their own weight, which can make them difficult to latch at the keel. Relocating the latch interface shortens and reduces the weight of the cowl, thereby at least partly mitigating this tendency to sag. With regard to the thrust reverser doors 104, the location of the center of gravity of each door 104 with respect to the hinge point may help bias the door half closed for this relocated latch position.

Referring to FIG. 9, the second embodiment of the high-mounted nacelle 300 may include the retaining structure 302 configured to engage and selectively retain in a closed position certain nacelle components (e.g., cowl doors 102, thrust reverser doors 104) while accommodating relative displacements between components. In more detail, the retaining structure 302 may allow for retaining the cowl doors 102 and the thrust reverser doors 104 independent of each another while facilitating access to the engine 106 and operation of the thrust reverser. Further, the retaining structure 302 may allow for "slippage" between the fixed retaining side of the attachment and the interconnected moving side latched or otherwise fastened to the nacelle component. A sliding mechanism may accommodate deflections due to thermal expansion and flexure during aircraft maneuvers without introducing adverse loading into the support structure 202 at the attachment points.

The retaining structure 302 may be located opposite the support structure 202 in order to facilitate similar access and operation as provided by a low-mounted design. An implementation of the retaining structure 302 may be configured for use with an exemplary high by-pass turbofan engine with a separate flow nacelle (i.e., fan air and engine exhaust flow through physically separate ducts/nozzles). This implementation of the support structure 202 may be compatible with features to integrate a translating sleeve cascade thrust reverser or fan duct (no reverser).

Referring also to FIG. 10-13, the retaining structure 302 may broadly comprise a fixed support track 304 and a plurality of translatable keepers 306 configured to positively engaging latch mechanisms 308 on nacelle components. The fixed support track 304 may be mounted to the pylon, and may include an elongated channel 310 configured to receive a translation end 312 of each of the translatable keepers 306. The fixed support track 304 may be non-permanently or permanently attached to or partially or fully integrated into the engine pylon or other support or engine 106.

The translatable keepers 306 may each include the translation end 312 and an engagement end 314. The translation end 312 may slideably engage the fixed support track 304 so as to be slideably repositionable along at least a portion of the elongated channel 310. The engagement end 314 may be configured to selectively engage and retain the latch mechanism 308 which may be coupled with the cowl doors 102 and/or the thrust reverser doors 104. Thus, while the engagement end 314 securely retains the latch mechanism 308, the translation end 312 allows for relative longitudinal movement between the retaining structure 302 and the doors 102,104 while also resisting lateral and vertical forces. The translation end 312 may further include a pin hole 316, and the doors 102,104 or other nacelle components may include a "dagger" pin 318 configured to enter the pin hole 316 when the doors 102,104 are closed and the latch mechanism 308 is engaged with the engagement end 314 of the translatable keeper 306.

Depending on the nature and characteristics of the nacelle component, the nacelle component may have one or more latch mechanisms 308 which engage one or more translatable keepers 306. For example, in one implementation, the thrust reverser doors 104 may include multiple latch mechanisms 308 engaging a single translatable keeper 306 which is supported by a single fixed support track 304.

The fixed support track 304, translatable keepers 206, and latch mechanisms 308 are examples, and any one or more may be omitted or modified to provide similar functionality in resisting applied forces and achieving the required functionality. In particular, the type of nacelle, thrust reverser, and/or engine; the number of nacelle components and how they are supported; and integration constraints may influence the number, sizes, locations, shapes, and other designs aspects of the components of the retaining structure 302.

Referring to FIG. 14, the third embodiment of the high-mounted nacelle 400 may include the bottom-mount pylon 402 and the side-mount pylon 502 configured to support the engine 106 and other components of the nacelle. Further, the pylon 402 may include one or more fairings to increase aerodynamic efficiency. An implementation of the pylon 402 may be configured for use with an exemplary high by-pass turbofan engine with a separate flow nacelle (i.e., fan air and engine exhaust flow through physically separate ducts/nozzles). This implementation of the pylon 402 may be compatible with features to integrate a translating sleeve cascade thrust reverser or fan duct (no reverser).

Referring also to FIG. 15, the bottom-mount pylon 402 may broadly comprise a structural torque box assembly 412; an aft engine mount pedestal 414; pylon-to-wing fairings 416,418; a pylon-to-nacelle forward fairing 420; a thrust reverser skirt fairing 422; an aft cowl fairing 424; first and second aft fairings 426,428; forward and aft firewalls 430, 432; and forward and aft engine mount locations 434,436. The structural torque box assembly 412 may be a drilled and fastened metallic structure. The structural torque box assembly 412 may include upper and lower spar components constructed of stainless steel machine parts, internal frames and bulkheads constructed of aluminum alloy machine parts, and side skins constructed of aluminum alloy machine parts. Access holes may be provided in the side skins to facilitate accessing the inside of the torque box. The aft engine mount pedestal 414 may be located on the upper spar component of the structural torque box assembly 412, and may provide an interface to support and attach the engine aft mount.

The pylon-to-wing fairings 416,418 may be located at a forward end of the pylon 402, and may be configured to aerodynamically blend the shape of the pylon 402 to the shape of the trailing edge of the wing. The pylon-to-wing fairings 416,418 are removable for accessing the pylon-to-wing attachment joint as well as any systems that may be routed along the upper spar component of the structural torque box assembly 412. The pylon-to-nacelle forward fairing 420 may be configured to aerodynamically blend the shape of the nacelle 400 to the shape of the pylon 402. The pylon-to-nacelle forward fairing 420 may be removable for accessing any systems that may be routed along the upper spar component of the structural torque box assembly 412.

The thrust reverser skirt fairing 422 may aerodynamically blend the shape of the pylon 308 to the shape of the nacelle 400 in the area of the thrust reverser or fan duct. The aft cowl fairing 424 may be configured to aerodynamically blend the shape of the pylon 402 to the shape of the nacelle 400 in the area of the aft cowl. The fairings 422,424 may be located adjacent to the nacelle fire zone, and may be constructed from composite materials with a sufficient number of plies to provide a fire barrier and/or may be protected by fire-resistant/fire-proof materials. The first and second aft fairings 426,428 may be configured to provide an aerodynamic closeout. The second aft fairing 428 may be configured to function as a heat shield, and may be constructed of heat resistant alloy components.

The forward and aft firewalls 430,432 as well as the upper spar component of the structural torque box assembly 412 may be constructed of fire-proof materials that bound the nacelle fire zone and protect the pylon structure underneath. Insulation may be used to provide a thermal barrier between the engine core temperature and the structural torque box assembly 412. Additionally, referring to FIG. 16A, the pylon may include a fluid management system 450 which may include pylon-mounted fire seal depressors 452 located along an upper edge of a fluid containment installation 454 and which may cooperate with thrust reverser-mounted fire seals 456 to provide a fire barrier when the thrust reverser is closed. More specifically, potential leaks from flammable fluid (e.g., jet fuel, hydraulic oil) lines must be contained and routed safely overboard. As these potential leaks originate above the supporting pylon structure in the high-mounted design, it may be desirable to manage these fluids. The compressible fire seal 456 located along the lower edge of each side of the thrust reverser may provide a vapor and fluid resistant barrier when the thrust reverser is closed. To manage potential pooling of fluids on the fire seal 456, which could lead to seepage past the fire seal 456, a shield 458 may be positioned above the fire seal 456 to direct fluid away from the fire seal interface. The shield 458 may also prevent direct exposure of the fire seal 456 to flames in the event the vapor or fluid ignites. Fluid may be managed below the fire seal interface by a fluid containment enclosure 460 supported by the pylon and extending from approximately the upper spar to a point above the fire seal depressor 452. The enclosure 460 may be bounded at its forward and aft limits by the forward and aft firewalls, respectively. It may also be bounded near the nacelle retention fixed support tracks at either side. Once the fluid is conducted to a low or the lowest point within the bounded volume of the enclosure 460, it may be collected and routed overboard via drain lines.

The forward and aft engine mount locations 434,436 are shown adapted to accommodate an example high by-pass turbofan engine, and may be located at forward location near the fan case and at an aft location near the engine rear turbine frame. Other locations maybe used for different engines. Thrust links may connect between the rear mount and the engine core near the fan and may transmit engine thrust loads to the pylon structure.

Figure 16A:
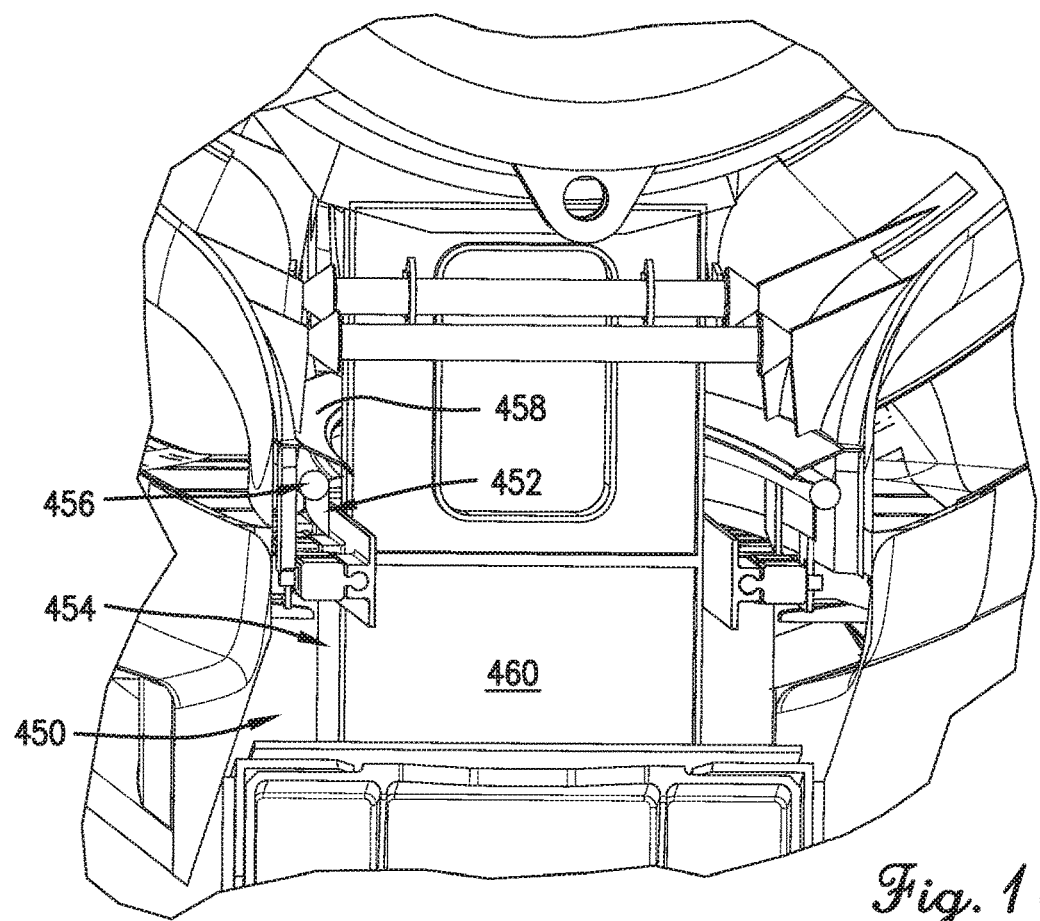
FIG. 16A is a fragmentary cross-sectional front elevation view of a flammable fluid containment system of the pylon.
Figure 16B:
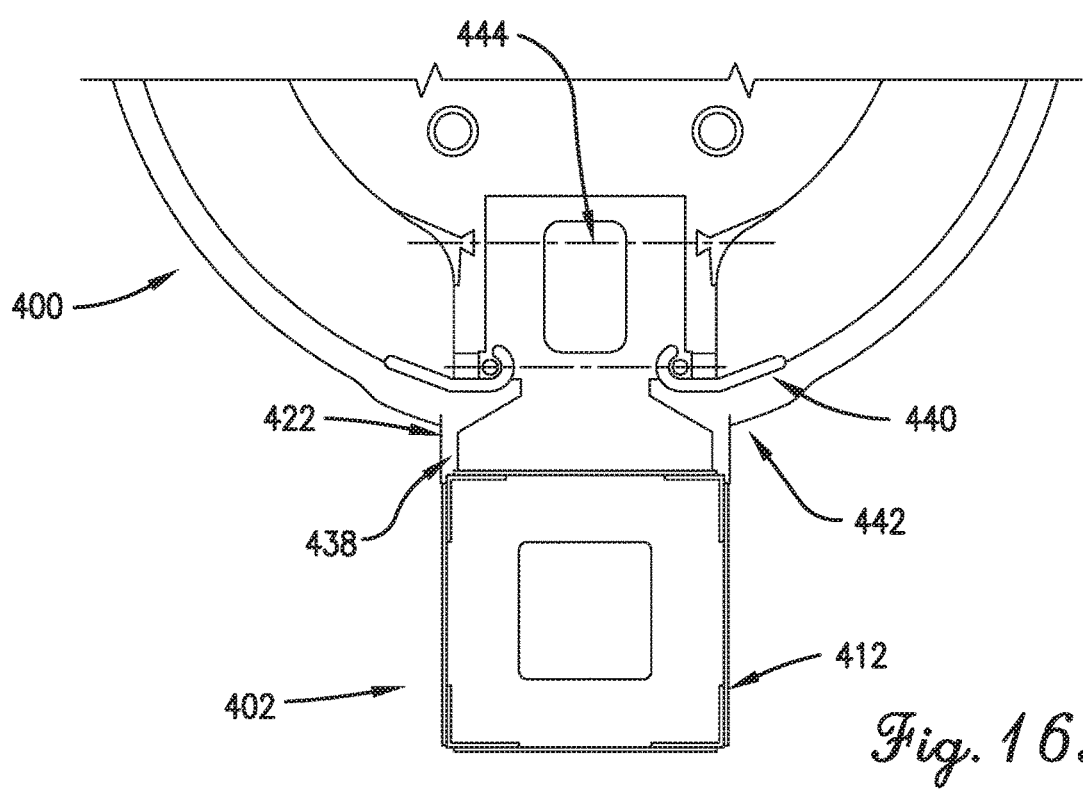
FIG. 16B is a fragmentary cross-sectional front elevation view of a latch beam component of the pylon.

The cowl doors 102 and thrust reverser doors 104 may be hinged near the top of the nacelle 400 (such as by the support structure 202 described above). Referring also to FIG. 16B, when closed, the cowl doors 102 may secure with a latch 440 at the pylon 402 to a latch beam 438 (which may be a version of the retaining structure 302 described above). The latch beam 438 may be a "carry-through" structure providing a side-to-side load path for the cowl doors 102. Aerodynamic seals or fairings 420 may be provided at the interfaces of the cowl doors 102 and the pylon 402. If the engine fan case compartment is a fire zone, these aerodynamic seals or fairings 420 may be constructed of fire resistant materials. Flammable fluid containment and management may employ an installation similar to that previously described. When closed, the thrust reverser doors 104 may also latch with the latch 440 at the pylon 402 to the latch beam 438. The latch beam 438 may also support the thrust reverser lower compression rods 444 when the thrust reverser door 104 is open. The latch beam 438 may be floating relative to the pylon structure, or may be fixed to the pylon structure and direct the load into the pylon 402. Shear pins may be employed near the latches 440 to both align the lower edge of the nacelle component with the latch-beam 438 and provide a shear load path at the joint. Use of this type of joint and properly strengthened structure may allow the pylon 402 to "load share" with the nacelle 400 to support a portion of the nacelle 400 and engine 106. While illustrated with an engine/nacelle installation positioned completely above the pylon structure, different engine/nacelle support methods may place the latch beam 438 adjacent to the pylon sides with the pass-through load path passing through the pylon structure. Similarly, the engine/nacelle installation may require the load path to be located below the pylon 402.

Figure 17:
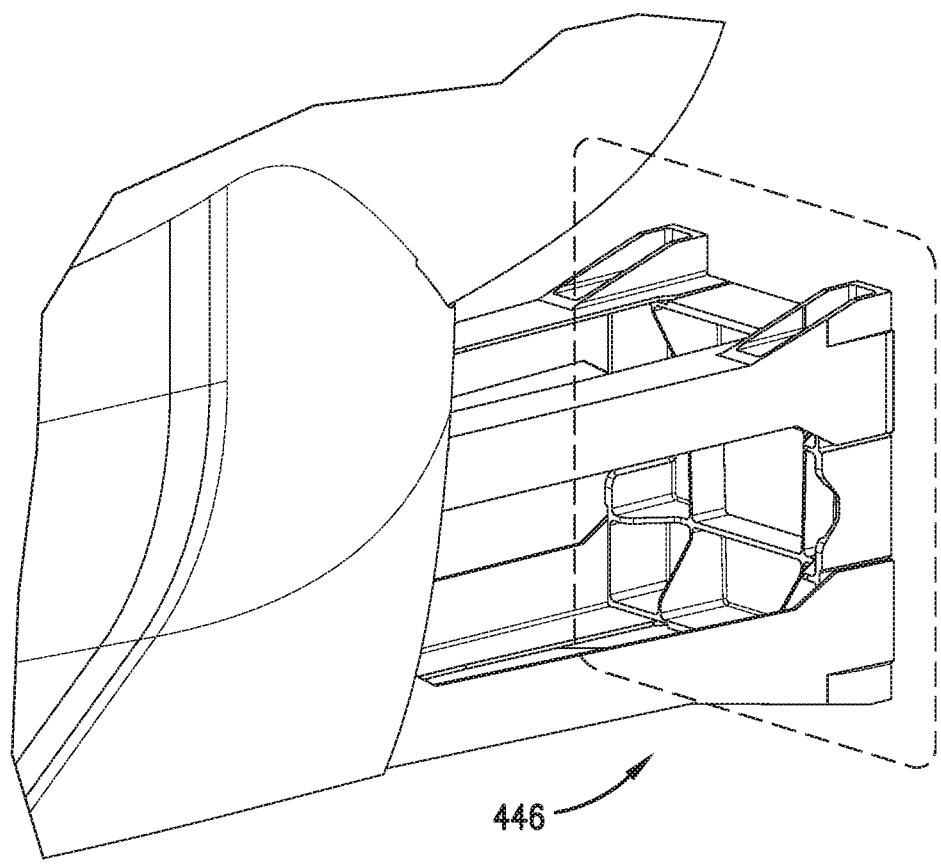
FIG. 17 is an isometric view of an airframe joint portion of the pylon.

Referring to FIG. 17, the pylon 402 may be attached to the airframe using any of a variety of different attachment solutions 446. In one implementation, a production break may be utilized between the pylon 402 and the airframe, and the two structures may be joined during final assembly of the aircraft. One attachment solution may utilize four single-pin joints 448 in which the upper pair attach directly to fittings on the wing while the lower pair attach to the wing via linkages. The link load lines may be oriented such that they intersect the wing structure at the intersection of the wing rib and rear spar. Another attachment solution may be a tension joint, in which the two structures abut one another at a designed interface location and are secured together with tension fasteners (e.g., bolts). These discrete attachments facilitate handling and shipping of damaged/repaired or spare pylons. In yet another attachment solution, the pylon 308 may be an integral part of the airframe structure.

Systems may be routed relative to the pylon 402 using any of a variety of different routing solutions. In one such solution, at least some systems may be routed above the upper spar component of the structural torque box assembly 312 and under one or both of the pylon fairings 420,422. In another such solution, at least some systems may be routed inside the structural torque box assembly 412, which may be facilitated by cutouts in the side skins and/or the upper spar component.

For engines with an accessory gear box (AGB) located at the engine core, a core services disconnect (CSD) 442 may be supported from upper spar component of the structural torque box assembly 312 and extend toward the centerline axis of the engine 106. Disconnect panels may be provided on either side of the CSD 442 to allow for cleanly separating connections between systems routings support on the pylon side from systems routings support on the engine 106. For engines with an AGB located on the engine fan case, a pylon-mounted fan services disconnect (FSD) may provide this function.

It will be appreciated that the first implementation of the pylon 402 and/or aspects thereof may be adapted for use as a "boom" for supporting munitions, equipment, sensors, instrumentation pods, or aerial refueling apparatuses, rather than engines.

Figure 18A:
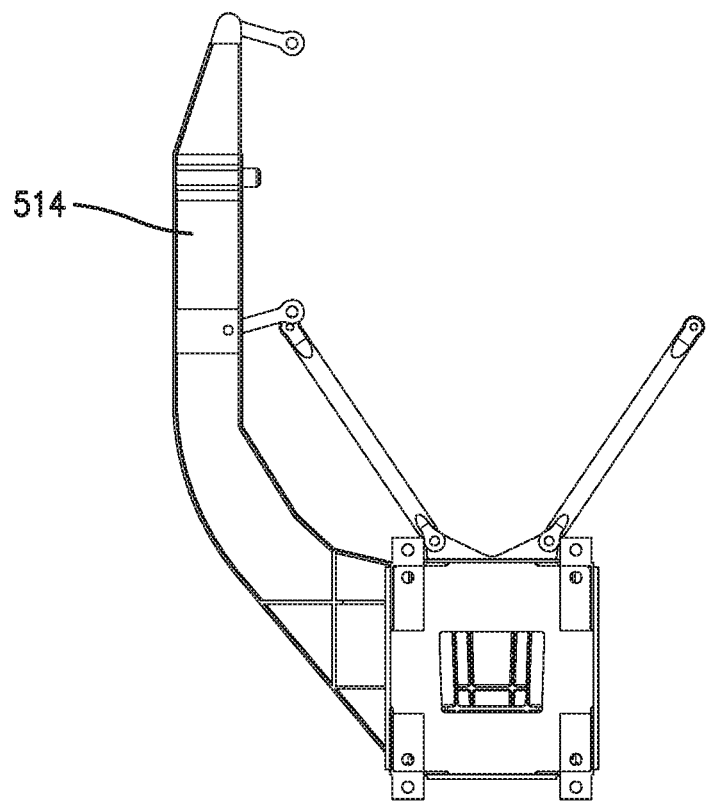
FIG. 18A is a cross-sectional side elevation view of a side-mount implementation of the pylon.
Figure 18B:
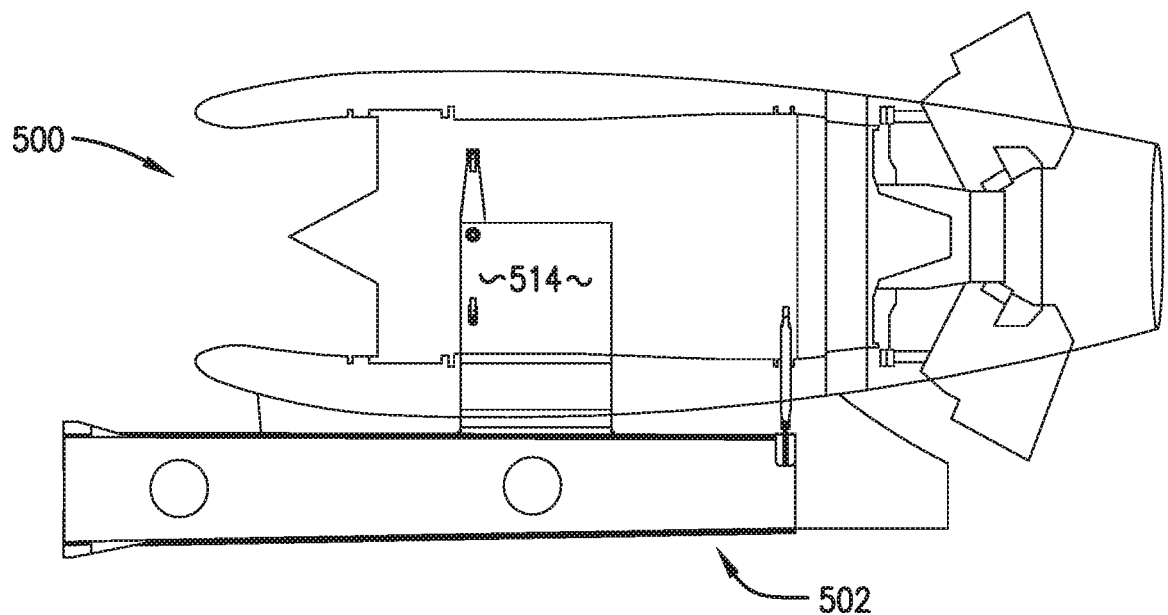
FIG. 18B is a cross-sectional front elevation view of the side-mount implementation of the pylon.

Referring also to FIGS. 18A and 18B, the side-mount pylon 502 provides an alternative second implementation configured to support a "side-of-body" mounted (SOBM) engine which is common on small commercial and business jets. This implementation may involve some differences in the engine support and nacelle integration. In particular, the engine mounting/support structure may connect the pylon structure to mounting points on the side of the engine.

Referring also to FIGS. 19A and 19B, the side-mount pylon 502 may broadly comprise a structural torque box assembly 512; a side spar assembly 514; pylon-to-nacelle fairings 516,518; pylon-to-wing fairings (not shown); a trailing edge fairing 520; a leading edge fairing (not shown); a nacelle apron 524; firewalls 526,528,530; and forward and aft engine mount locations 532,534. The structural torque box assembly 512 may be a drilled and fastened metallic structure. The structural torque box assembly 512 may include upper and lower spar components constructed of stainless steel machine parts, internal frames and bulkheads constructed of aluminum alloy machine parts, and side skins constructed of aluminum alloy machine parts. Access holes may be provided in the side skins to facilitate accessing the inside of the torque box. The structural torque box assembly 512 may employ planar spars and skins to facilitate manufacturing and assembly.

The side spar assembly 514 may be constructed of aluminum and stainless steel machine parts, and may be attached to the structural torque box assembly 512 and configured to provide support for the engine and to react engine thrust loads into the structural torque box assembly 512. In order to reduce drag, a forward engine support assembly may be integrated into the side spar assembly 514. The side spar assembly 514 may be protected by fire-proof thermal insulation.

The pylon-to-nacelle fairings 516,518 may be located on the inboard side of the pylon 502 and configured to aerodynamically blend the shape of the nacelle 500 to the shape of the pylon 502. The pylon-to-nacelle forward fairing 518 may be removable for accessing any systems that may be routed along the upper spar component of the structural torque box assembly 512. The forward fairing 518, which may be adjacent to the nacelle fire zone, may be manufactured from composite materials with a sufficient number of plies to provide a fire barrier. The pylon-to-wing fairings (not shown) may be located at the forward end of the pylon 502 and may be configured to aerodynamically blend the shape of the pylon 502 to the trailing edge of the wing. The pylon-to-wing fairings may be removable for accessing the pylon-to-wing attachment joint as well as any systems that may be routed along the upper spar component of the structural torque box assembly 512. The trailing edge fairing 520 may be constructed of heat resistant alloy components, and may be configured to provide an aerodynamic closeout while allowing for deployment of the thrust reverser. The leading edge fairing may be constructed of heat resistant materials, and the leading edge may be biased to direct the exhaust of the thermal anti-ice (TAI) system toward the outboard side of the pylon. The nacelle apron 524 may be partially supported by the pylon structure, and may be configured to interface with adjacent pylon aerodynamic fairings 516.

The forward and aft firewalls 528,530 as well as the upper spar component of the structural torque box assembly 512 may be constructed of fire-proof materials that bound the nacelle fire zone and protect the pylon structure underneath. Insulation may be used to provide a thermal barrier between the engine core temperature and the structural torque box assembly 512. The firewalls 526,528,530 may be constructed of fire-proof materials, and may be configured to bound the nacelle fire zone and protect the pylon structure underneath.

The forward and aft engine mount locations 532,534 are shown adapted to accommodate an example mixed-flow high by-pass turbofan engine, and may be located at forward location near the fan case and at an aft location near the aft edge of the engine by-pass flow duct. Other locations may be used for different engines. Engine thrust loads may be transmitted through a shear pin interface between the engine case and the forward engine support spar 514 to the structural torque box assembly 512. The engine mountings and installed engine systems (EBU) may be "handed" (i.e., one configuration for left-hand side of the airframe and another configuration for the right-hand side), and these configurations may not be interchangeable.

The lower surface of the nacelle inlet may interface with an aerodynamic seal along the upper edge of the leading fairings 518. The pylon 502 may be attached to the airframe using any of a variety of different attachment solutions. One such solution may utilize the four-point tension joint 536.

Systems may be routed relative to the pylon 502 using any of a variety of different routing solutions. In one such solution, at least some systems may be routed above the upper spar component of the structural torque box assembly 512 and under the pylon-to-wing fairing (not shown). In another such solution, at least some systems may be routed inside the structural torque box assembly 512, which may be facilitated by cutouts in the side skins and/or the upper spar component.

In other ways, the side-mount pylon 502 may be substantially similar or identical to the bottom-mount pylon 402. For example, the pylon 502 may include the latch beam 438 or a version thereof.

It will be appreciated that the second implementation or the pylon 502 and/or aspects thereof may also be adapted for use as a "boom" for supporting munitions, equipment, sensors, instrumentation pods, or aerial refueling apparatuses rather than engines.

Figure 20:
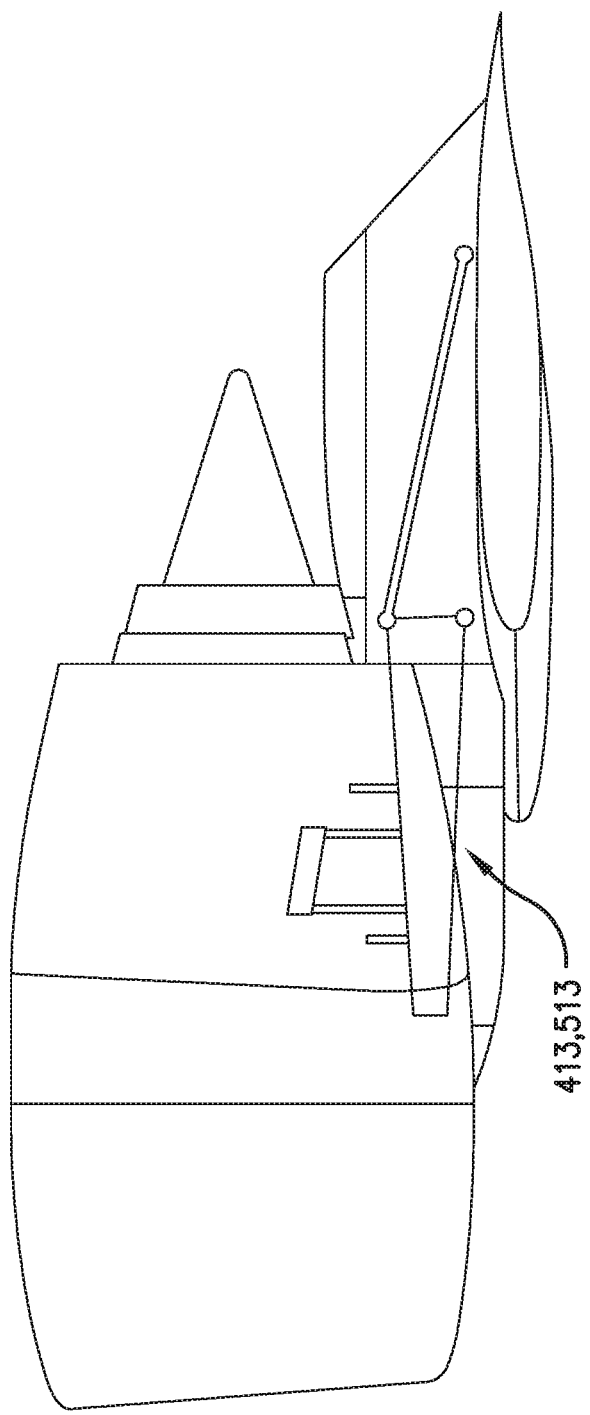
FIG. 20 is a cross-sectional side elevation view of an alternative implementation of a structural torque box assembly portion of the pylon for a forward-and-above wing installation.

It will be appreciated that the location of the engine/nacelle installation, the engine type, and the airframe attachment location may influence the shape of the pylon 402,502, so the shapes of the pylons 402,502 and components thereof may not be limiting. For example, FIG. 20 illustrates an alternative implementation of the structural torque box assembly 413,513 of the pylon 402,502 for a forward-and-above wing installation.

Nacelles, pylons, and other structures, cooperate to provide a fire-proof barrier against potential engine fires in designated fire zones. Prior art solutions involve mounting a compressible fire seal directly to an inner wall structure of the thrust reverser door 104 or on stand-off brackets attached to the inner wall structure. In these installations, the orientation of the cross-sectional centerline of symmetry of the seal is perpendicular to an inner surface of the inner wall structure of the door 104 when the door is closed. During maintenance, the thrust reverser doors 104 open about hinges having centerlines that are typically located above the fire seal. The orientation and mounting of the seal as well as the orientation of the fire seal depressor attached to its supporting structure in combination with the arc traversed by the seal during closure results in the seal contacting the depressor surface prior to full closure and being dragged, or "scrubbed," against the depressor in an upward motion until the door reaches the closed and secured position, which causes the seal to roll about its lengthwise axis as it is dragged upwardly along the surface of the depressor. This deformation can cause wrinkles to develop in the seal, which can create gaps between the seal and the depressor and thereby compromise the function of the fire seal. Further, in-flight deflections of the closed door result in an up-and-down scrubbing of the seal against the depressor leading to wear and premature failure. Engines with larger fans have increased in-flight deflection relative to the fire seal depressor surface, which increases the effects of scrubbing wear on the seal and thereby shortens the life of the seal or requires increasing the number of "wear" plies incorporated into the seal. Prior art solutions for reducing such deformation of the seal include the use of seal lubricants or Teflon paint on the surface of the depressor to allow the seal to slip across the surface with less scrubbing deformation and thereby extend the life of the seal.

Figure 21:
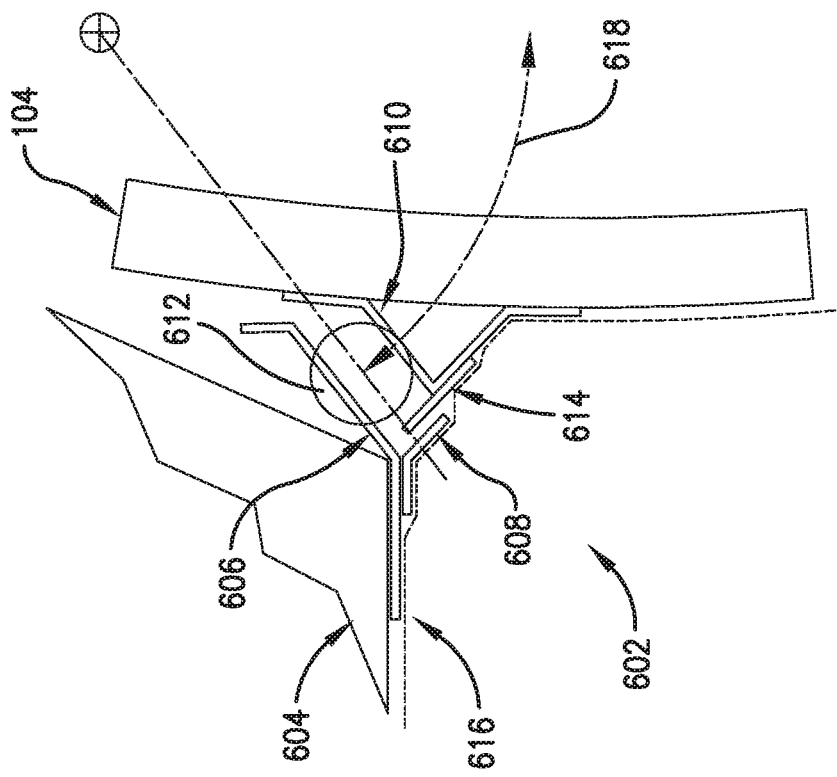
FIG. 21 is a fragmentary cross-sectional side elevation view of a fourth embodiment of the nacelle of FIG. 1 including a first implementation of the fire seal assembly.

Referring to FIG. 21, the fourth embodiment of the high-mounted nacelle 600 includes various implementations of a fire seal assembly configured to provide or at least participate in a fire-proof barrier, in which the seal does not contact the depressor surface until almost or immediately before the door is closed, thereby creating substantially direct compression of the seal and minimizing the amount of scrubbing, roll-over, deformation, wrinkling, and wearing of the seal. Further, in-flight deflections of the closed door result in substantially compressive deformations along the axis of symmetry of the seal (i.e., normal to the base of the seal), thereby reducing wear.

As used herein, the phrases "almost closed" or "immediately closed," and variations thereof, may to some extent depend on the design and positions of the relevant surfaces and of the seal. For the illustrated design, and generally for a smaller seal, these terms are defined as the door 104 being at or within 5 degrees, or at or within 2 degrees, of travel along its arc of movement of being in the fully closed position, and the remaining travel may compress the seal by at or within 30%. For a larger seal, these terms are defined as the door 104 being at or within 6 degrees, or at or within 3 degrees, and compression of at or within 30%. As used herein, the phrase "substantially direct compression," and variations hereof, is relatedly defined as a compressive force being applied under the above defined parameters which result in compression substantially along the cross-sectional centerline of symmetry of the seal. It will be appreciated that these phrases are related in that they describe a design which minimizes the tangential application of compressive force to the seal, which minimizes the scrubbing experienced in prior art designs.

Referring to FIG. 21, a first implementation of a fire seal assembly 602 may broadly comprise a structure 604, a depressor surface 606 and a first flame shield 608 associated with the structure surface 604, a seal support surface 610, a seal 612 and a second flame shield 614 attached to the seal support 610, and thermal insulation 616. It will be appreciated that while the flame shields 608,614 are shown, some applications may not require them.

The depressor surface 606 and the seal support surface 610 are positioned and oriented such that both surfaces are perpendicular to an opening/closing arc 618 of the thrust reverser door 104, so that the seal 612 does not contact the depressor surface 606 until almost or immediately before the door 104 is closed, at which time the surfaces 606,610 may be almost parallel or at least as close to parallel as they can become given the thickness and shape of the fire seal 612, thereby creating substantially direct compression of the seal 612 and minimizing the amount of scrubbing, roll-over, deformation, wrinkling, and wearing of the seal 606.

Figure 22:
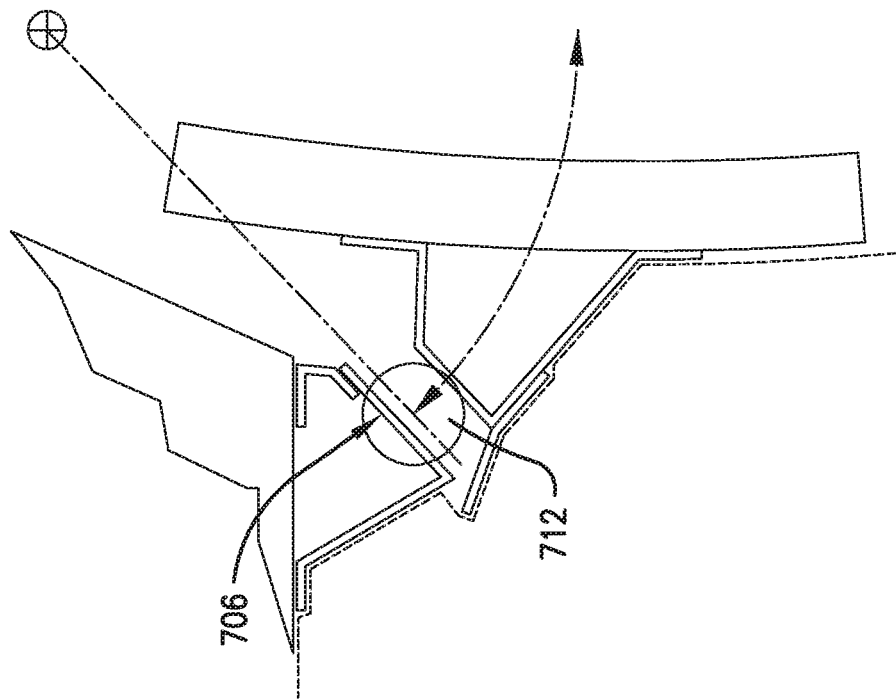
FIG. 22 is a fragmentary cross-sectional side elevation view of a second implementation of the fire seal assembly.
Figure 24:
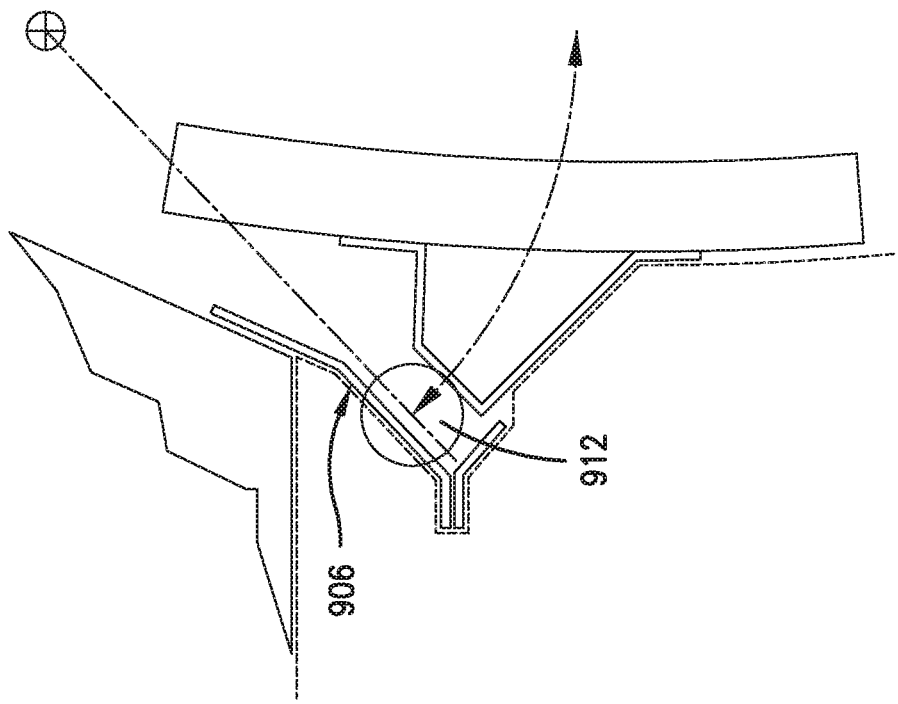
FIG. 24 is a fragmentary cross-sectional side elevation view of a fourth implementation of the fire seal assembly.
Figure 23:
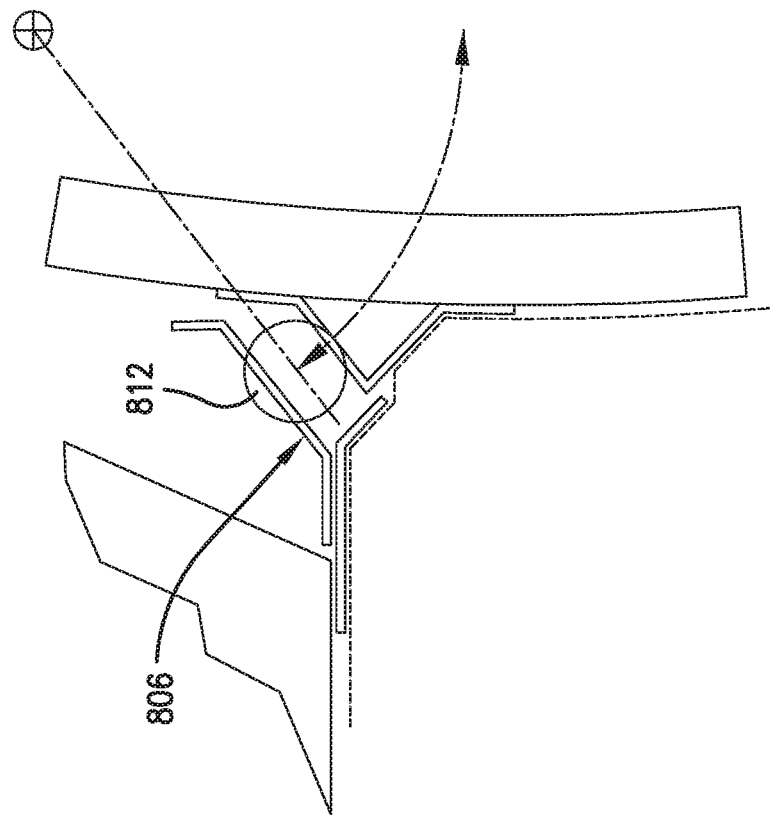
FIG. 23 is a fragmentary cross-sectional side elevation view of a third implementation of the fire seal assembly.
Figure 25:
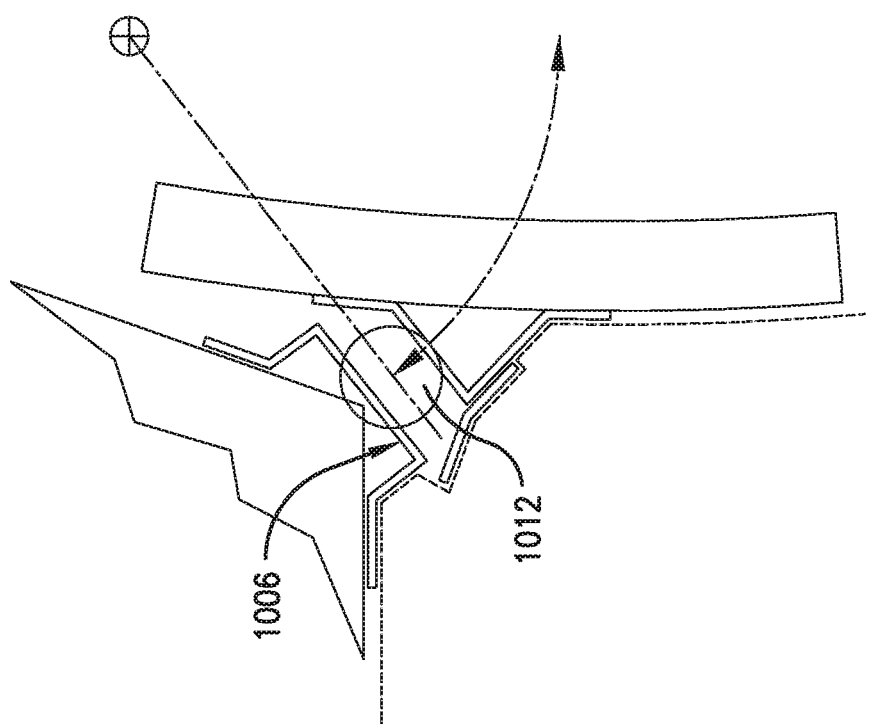
FIG. 25 is a fragmentary cross-sectional side elevation view of a fifth implementation of the fire seal assembly.
Figure 26:
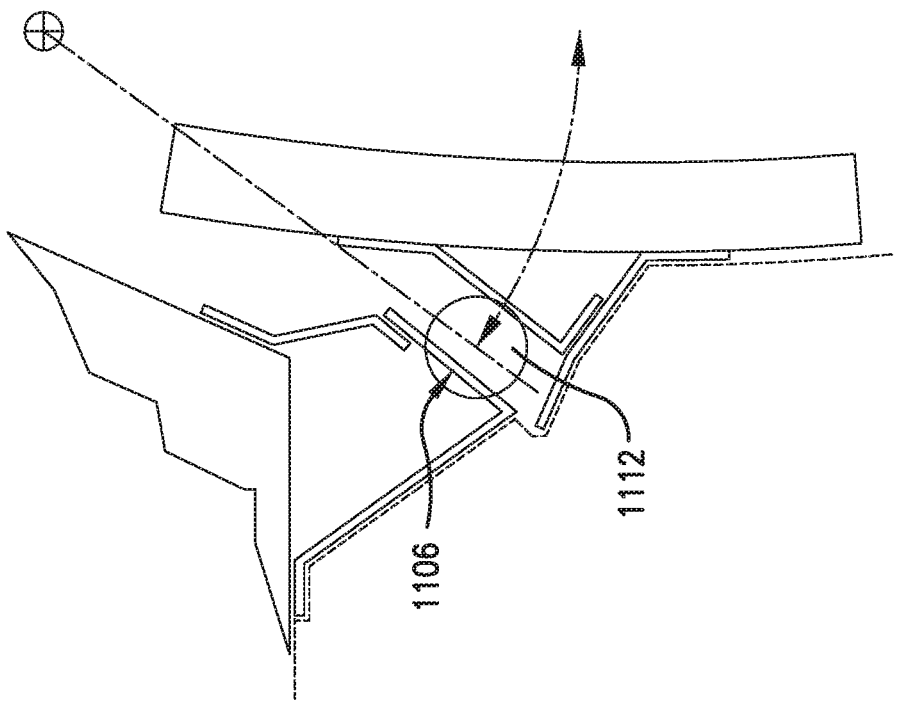
FIG. 26 is a fragmentary cross-sectional side elevation view of a sixth implementation of the fire seal assembly.
Figure 28:
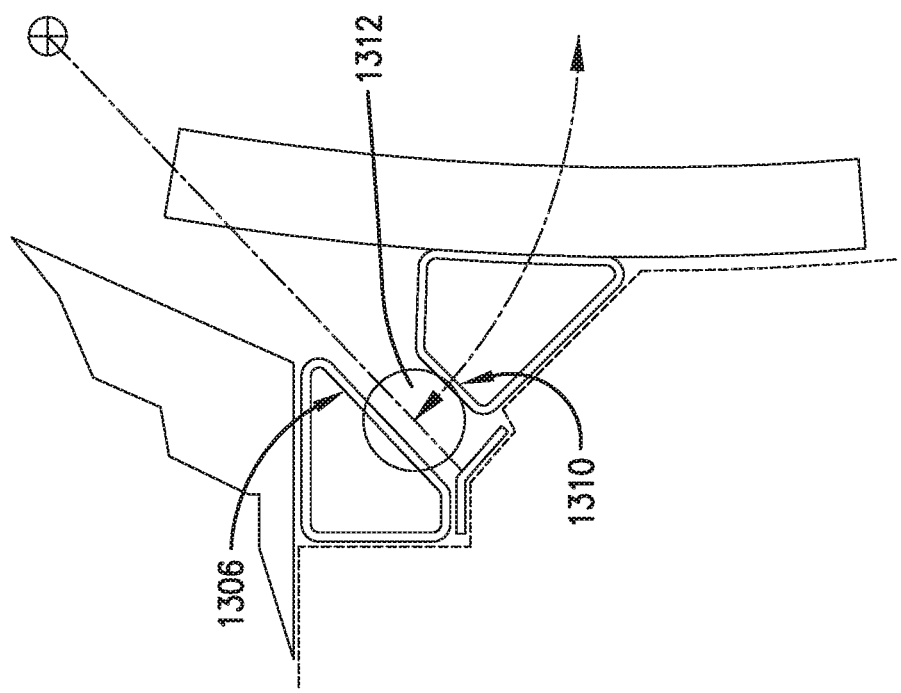
FIG. 28 is a fragmentary cross-sectional side elevation view of a eighth implementation of the fire seal assembly.
Figure 27:
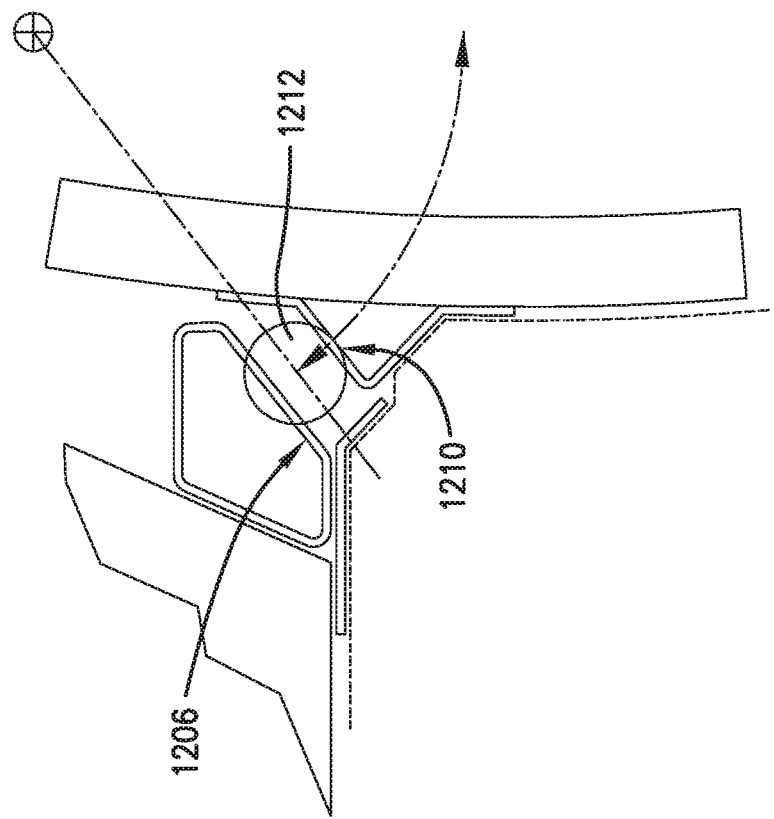
FIG. 27 is a fragmentary cross-sectional side elevation view of a seventh implementation of the fire seal assembly.

Fire seal paths may be routed at differing elevations and lateral positions along its length with respect to the structure supporting the depressor. FIGS. 22-29 show additional implementations of the fire seal assembly having various seal positions and supports and depressor configurations and mountings, but which otherwise function substantially similar to the first implementation at least with regard to the compression of the seal. In FIG. 22, the interface between the seal 712 and the depressor surface 706 is shown located above the direct expose area of the fire zone. In FIG. 23, the interface between the seal 812 and the depressor surface 806 is shown located adjacent to the direct exposure area of the fire zone. In this implementation, thermal insulation may be used on the backside of the depressor to protect the seal from the high heat of normal operation and the extreme heat of a fire. FIG. 24 shows another possible alternative implementation of the depressor surface 906 and fire seal 912. FIG. 25, shows another possible alternative implementation of the depressor surface 1006 and fire seal 1012. FIG. 26, shows another possible alternative implementation of the depressor surface 1106 and fire seal 1112. In FIGS. 27 and 28, alternative implementations of the depressor surface 1206, 1306 and seal support surface 1210,1310 are shown. Fire proof materials may be used, and the surface 1210,1310 may be constructed by bulge forming metal (steel, Inconel), super-plastic forming (titanium), or composite bondments (high temperature capable polymer resins or inorganic ceramic matrices). In FIG. 29, a "shallow" implementation is shown in which the distance between the rotation point of the hinge and the depressor surface 1406 is relatively small. The depressor surface may be integral to the supporting structure and may utilize an applied protective surface. In similar fashion, the seal support surface may be integrally formed. If required the depressor and seal support may be reversed such that the depressor is the moving component contacting a stationary seal.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A support structure for a nacelle housing an engine, the nacelle being mounted on a pylon above a surface of an aircraft and including a door, the support structure comprising:
   a lower component including—
      forward support coupled with the engine and configured to resist a longitudinal force and a vertical force; and
   an upper component including—
      a fan case attachment configured to couple with a fan case of the engine and to resist the longitudinal force and a lateral force,
      an aft support configured to couple with an aft portion of the engine and to resist the vertical force and the lateral force, and
      one or more door supports configured to couple with the door and facilitate moving the door between an open position and a closed position,
   wherein the support structure is located on the nacelle above the pylon.

2. The support structure of claim 1, wherein the support structure is located on the nacelle opposite the pylon.

3. The support structure of claim 1, wherein the door is a cowl door configured to provide access to an interior of the nacelle.

4. The support structure of claim 1, wherein the door is a thrust reverser door configured to redirect an exhaust of the engine.

5. The support structure of claim 1, wherein the fan case attachment includes—
   a forward fan case attachment configured to couple with a forward portion of the fan case portion of the engine; and
   an aft fan case attachment configured to couple with an aft portion of the fan case portion of the engine.

6. The support structure of claim 5, wherein the forward fan case attachment includes one or more support links configured to resist the vertical force and the lateral force.

7. The support structure of claim 6, wherein the aft fan case attachment includes one or more adjustable links to resist the vertical force.

8. The support structure of claim 7, wherein the aft fan case attachment includes a spigot connection having a fitting including a spigot pin coupled with the support structure and engaging a bearing mounted to a spigot fitting on the fan case portion of the engine, wherein the spherical bearing resists the longitudinal force and the lateral force but allows for flexure of the support structure with respect to the engine.

9. The support structure of claim 1, wherein the door is a cowl door, and each of the one or more door supports cooperates with the door to facilitate rotating the door between the open position and the closed position.

10. The support structure of claim 1, wherein the door is a thrust reverser door, and each of the one or more door supports cooperates with the door to facilitate rotating the door between the open position and the closed position.

11. The support structure of claim 1, wherein the door is a thrust reverser door, and each of the one or more door supports cooperates with the door to facilitate sliding the door between the open position and the closed position.

12. The support structure of claim 1, wherein the upper component and the one or more door supports are each a carry-through structure that provides a side-to-side load path for the door.

13. The support structure of claim 1, further including one or more fire seal depressor surfaces on the support structure, with each fire seal depressor surface being configured to contact and compress a fire seal when the door is closed.

14. The support structure of claim 1, further including a fairing located on an upper surface of the upper component and configured to increase an aerodynamic efficiency of the support structure.

15. A support structure for a nacelle housing an engine, the nacelle being mounted on a pylon above a surface of an aircraft and including a door, the support structure comprising:
   a lower component including—
      a forward support coupled with the engine and configured to resist a longitudinal force and a vertical force;
   an upper component including—
      a fan case attachment configured to couple with a fan case of the engine and to resist the longitudinal force and a lateral force,
      an aft support configured to couple with an aft portion of the engine and to resist the vertical force and the lateral force, and
      one or more door supports configured to couple with the door and facilitate rotating the door between an open position and a closed position;
   one or more fire seal depressor surfaces on the support structure, with each fire seal depressor surface being configured to contact and compress a fire seal when the door is in the closed position; and a fairing located on an upper surface of the upper component and configured to increase an aerodynamic efficiency of the support structure,
wherein the support structure is located on the nacelle above the pylon.

16. A nacelle mounted on a pylon above a surface of an aircraft and configured to house an engine, the nacelle comprising:
a door;
a support structure located on the nacelle above the pylon and including—
a lower component including—
a forward support coupled with the engine and configured to resist a longitudinal force and a vertical force; and
an upper component including—
a fan case attachment configured to couple with a fan case portion of the engine and to resist the longitudinal force and the lateral force,
an aft support configured to couple with the an aft portion of the engine and to resist the vertical force and the lateral force, and
one or more door supports configured to couple with the door and facilitate moving the door between an open position and a closed position.

17. The nacelle of claim 16, wherein the support structure is located on the nacelle opposite the pylon.

18. The nacelle of claim 16, wherein the door is a cowl door configured to provide access to an interior of the nacelle.

19. The nacelle of claim 16, wherein the door is a thrust reverser door configured to redirect an exhaust of the engine.

20. The nacelle of claim 16, wherein the fan case attachment includes—
a forward fan case attachment configured to couple with a forward portion of the fan case portion of the engine; and
an aft fan case attachment configured to couple with an aft portion of the fan case portion of the engine.

21. The nacelle of claim 16, wherein the forward fan case attachment includes one or more support links configured to resist the vertical force and the lateral force.

22. The nacelle of claim 21, wherein the aft fan case attachment includes one or more adjustable links to resist the vertical force.

23. The nacelle of claim 22, wherein the aft fan case attachment includes a spigot connection having a fitting containing a spigot pin coupled with the support structure and engaging a bearing mounted to a spigot fitting on the fan case portion of the engine, wherein the spherical bearing resists the longitudinal force and the lateral force but allows for flexure of the support structure with respect to the engine.

24. The nacelle of claim 16, wherein the door is a cowl door, and each of the one or more door supports cooperates with the cowl door to facilitate rotating the cowl door between the open position and the closed position.

25. The nacelle of claim 16, wherein the door is a thrust reverser door, and each of the one or more door supports cooperates with the door to facilitate rotating the door between the open position and the closed position.

26. The nacelle of claim 16, wherein the door is a thrust reverser door, and each of the one or more door supports cooperates with the door to facilitate sliding the door between the open position and the closed position.

27. The nacelle of claim 16, wherein the upper component and the one or more door supports are each a carry-through structure that provides a side-to-side load path for the door.

28. The nacelle of claim 16, further including one or more fire seal depressor surfaces on the support structure, with each fire seal depressor surface being configured to contact and compress a fire seal when the door is closed.

29. The nacelle of claim 16, further including a fairing located on an upper surface of the upper component and configured to increase an aerodynamic efficiency of the support structure.

* * * * *